(12) United States Patent
Faris et al.

(10) Patent No.: US 6,377,325 B2
(45) Date of Patent: *Apr. 23, 2002

(54) REFLECTIVE FILM MATERIAL HAVING SYMMETRICAL REFLECTION CHARACTERISTICS AND METHOD AND APPARATUS FOR MAKING THE SAME

(76) Inventors: Sadeg M. Faris, 24 Pocantico River Rd., Pleasantville, NY (US) 10570; Le Li, 3491 Overlook Ave., Yorktown Heights, NY (US) 10598

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,877

(22) Filed: Jul. 9, 1997

(51) Int. Cl.$^7$ .............................................. G02F 1/1335
(52) U.S. Cl. ......................................................... 349/98
(58) Field of Search ..................................... 349/98.194

(56) References Cited

U.S. PATENT DOCUMENTS

| | | | | |
|---|---|---|---|---|
| 5,016,985 A | * | 5/1991 | Kalmanash et al. | 349/194 |
| 5,325,218 A | * | 6/1994 | Willett et al. | 349/98 |
| 5,364,557 A | * | 11/1994 | Faris | 252/299.7 |
| 5,486,935 A | * | 1/1996 | Kalmanash | 349/194 |
| 5,506,704 A | * | 4/1996 | Broer et al. | 252/299.7 |
| 5,691,789 A | * | 11/1997 | Li et al. | 349/98 |
| 5,989,461 A | * | 11/1999 | Coates et al. | 349/98 |

* cited by examiner

Primary Examiner—William L. Sikes
Assistant Examiner—Tarifura R. Chowdhury
(74) Attorney, Agent, or Firm—Thomas Perkowski PC; Gerow D. Brill

(57) ABSTRACT

Disclosed are novel reflective films having symmetrical reflection characteristics on the upper and lower surfaces thereof. Preferably, such films are made from cholesteric liquid crystal (CLC) material, wherein the pitch of the helices of the liquid crystal molecules therein varies along the thickness dimension (i.e. transverse to the surface) of the film. Depending on the final spiral structure of the materials utilized, the CLC circularly polarizing film materials reflect either left-handed or right-handed circularly polarized light. In a first illustrative embodiment, the CLC film has a laminated construction in order that both the upper and lower surfaces thereof have substantially the same reflection characteristics over its tuned reflection band. In second illustrative embodiment, the CLC film has a laminated construction in order that both the upper and lower surfaces thereof have substantially the same reflection characteristics over its broadband reflection band. By virtue of their circularly polarizing reflection characteristics, the CLC films of the present invention can be used to form polarization-encoded spatially multiplexed images (SMI) on radiation absorbing surfaces, coloring media with high brightness characteristics, CLC-based toner 2-D and 3-D xerographic printing processes, and the like.

30 Claims, 16 Drawing Sheets

"Non-specular coating"

Additive-primary CLC coloring media;
θ --- independent

"Quasi-specular coating"

θ --- dependent

"Double-layer construction"
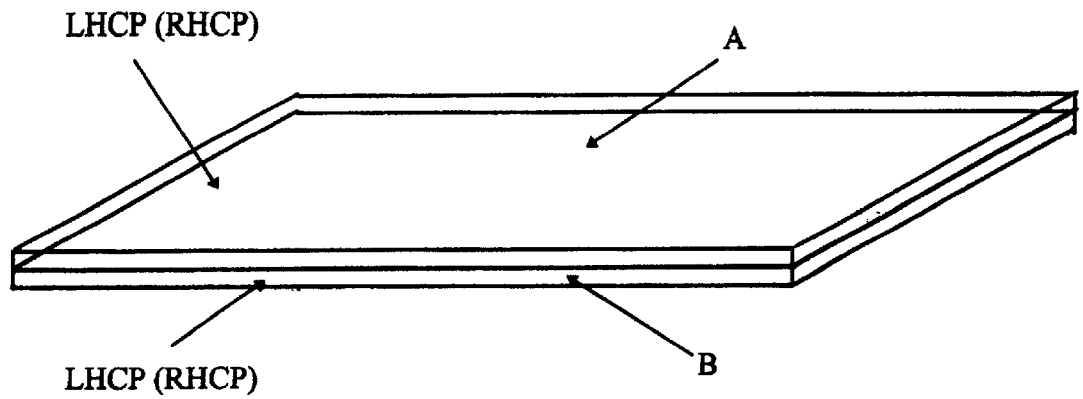
FIG. 2B
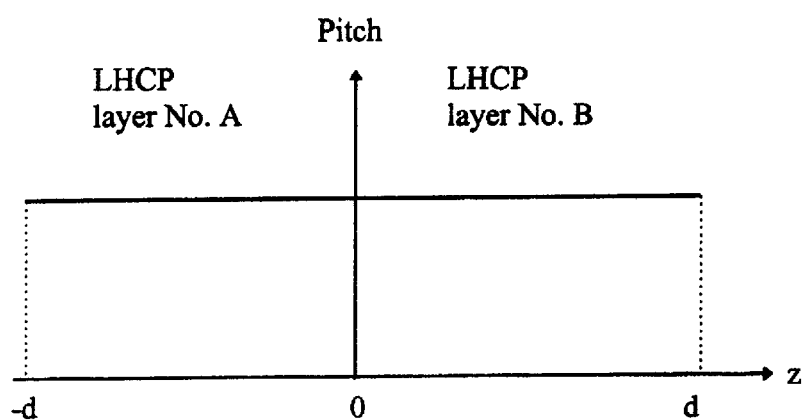
FIG. 2B1

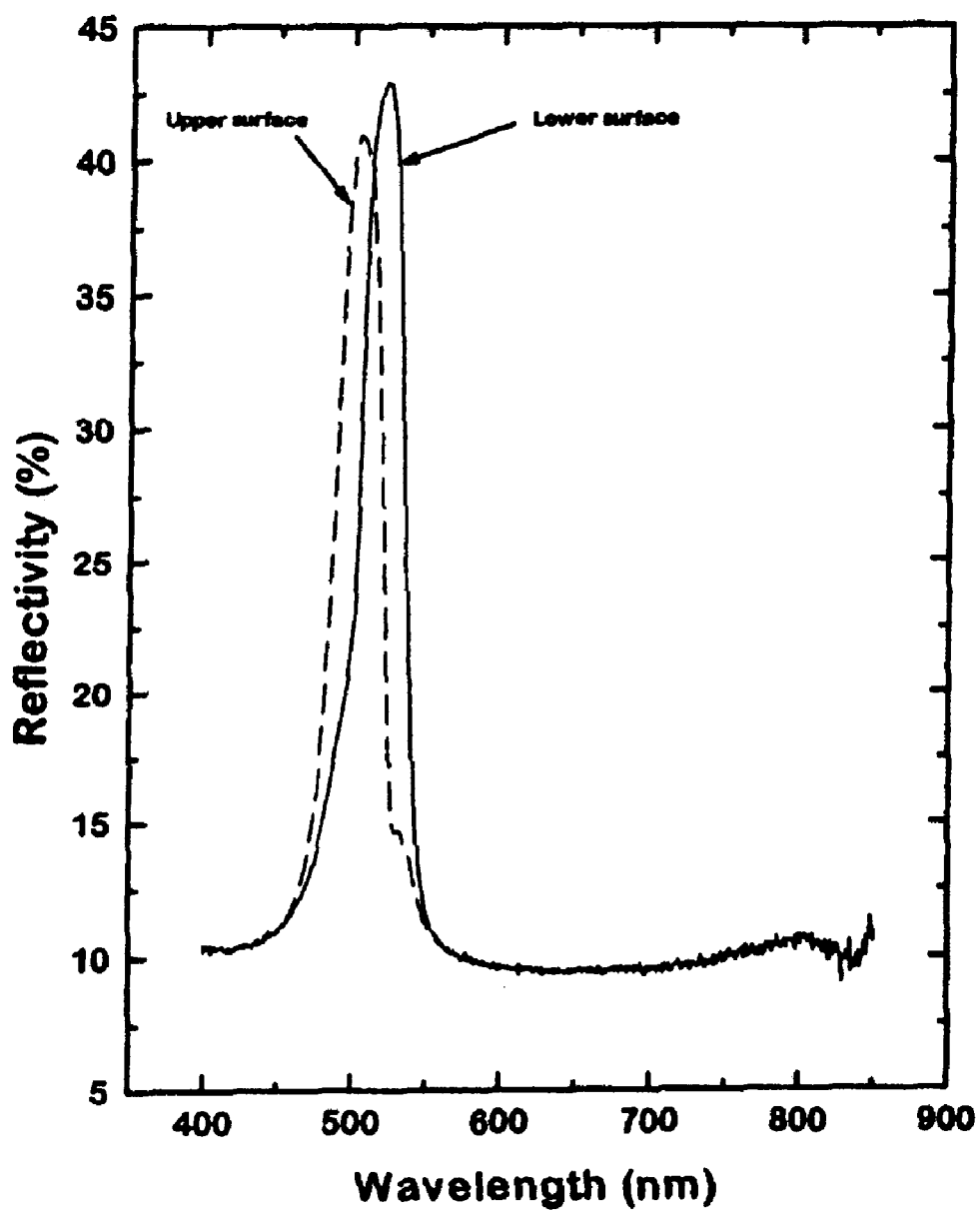
Fig. 2B2

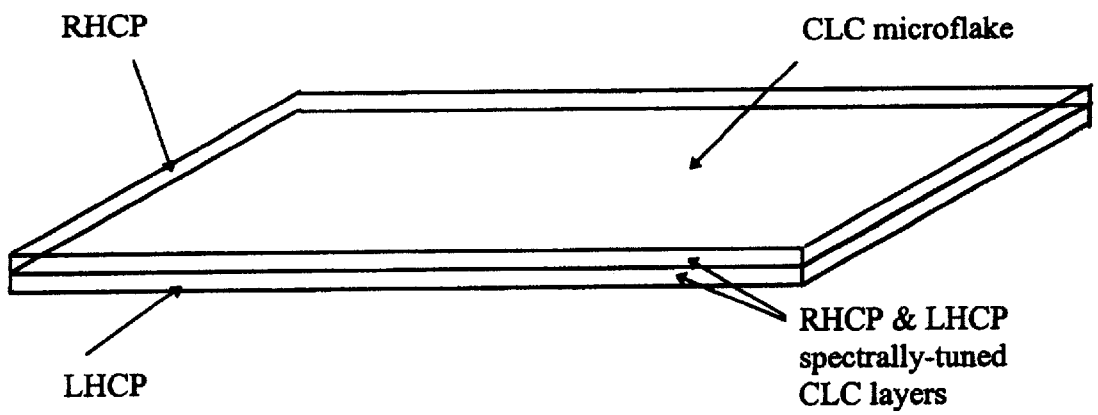
FIG. 2C
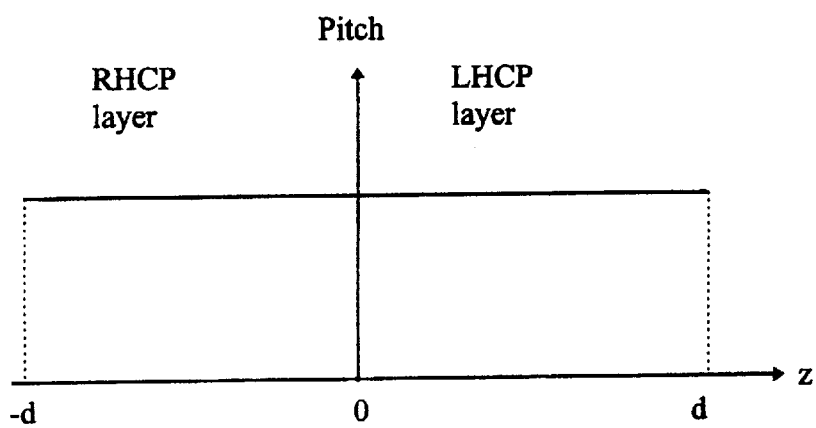
FIG. 2C1

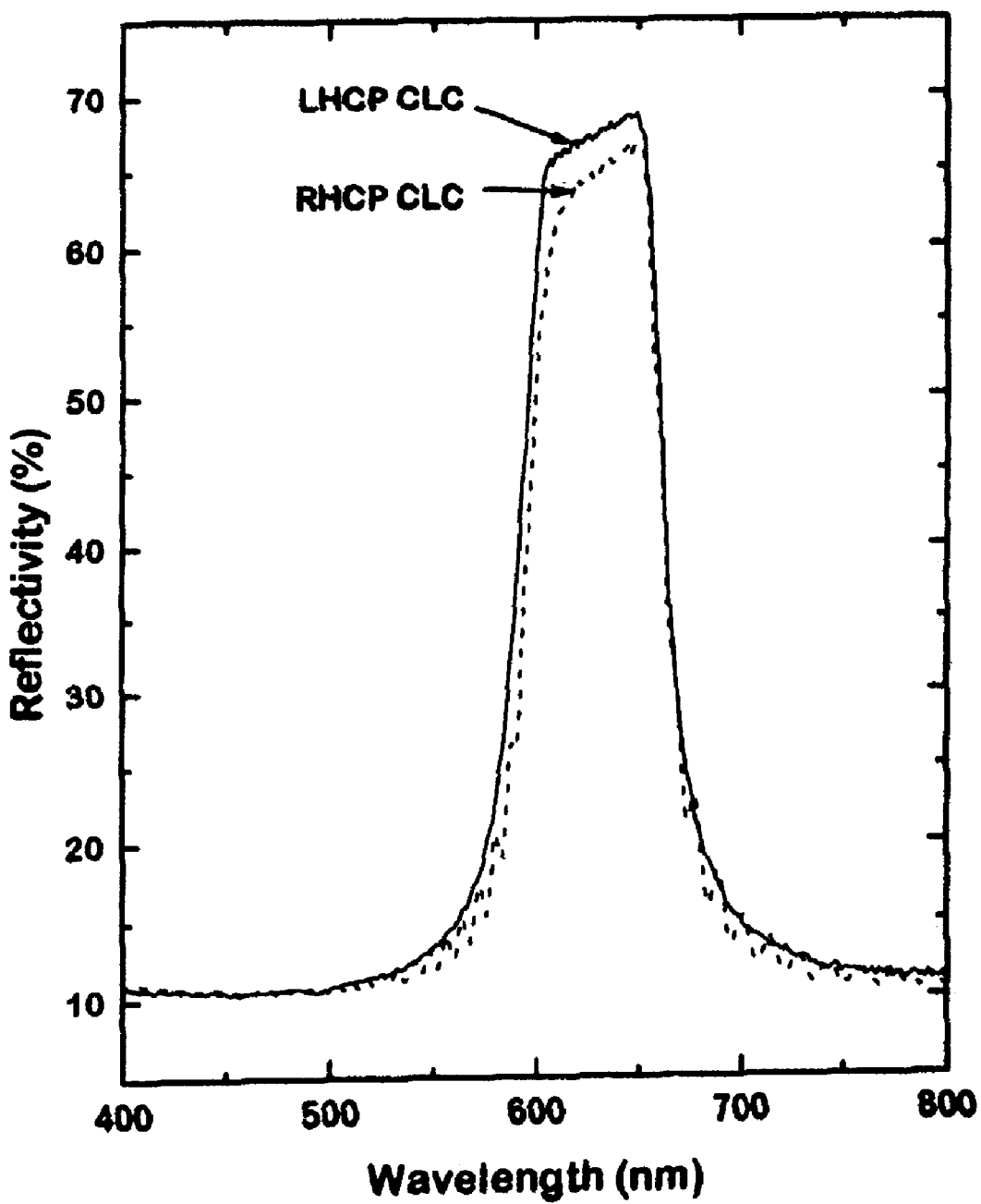
Fig. 2C2

"Spectrally-tuned" CLC microflakes with
π/2-π/2 phase retardation surface"
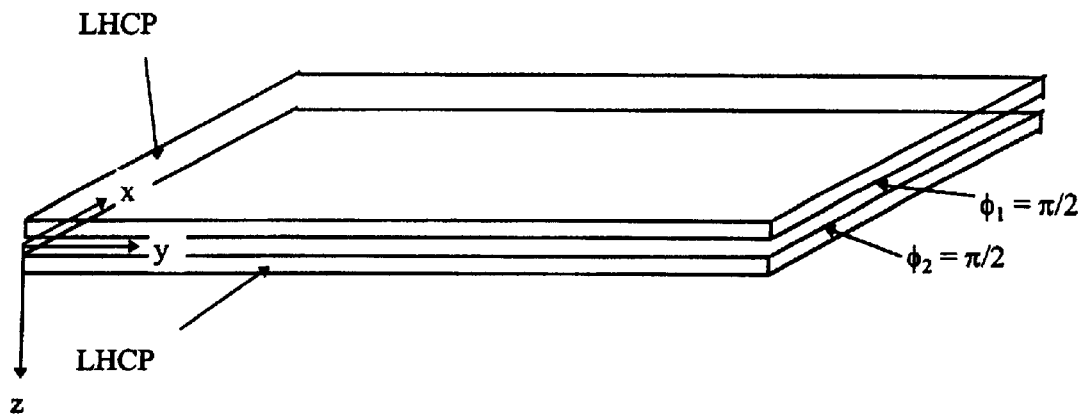
FIG. 2D1
"Spectrally-tuned" CLC microflakes with
π/2-π/2 phase retardation surface"
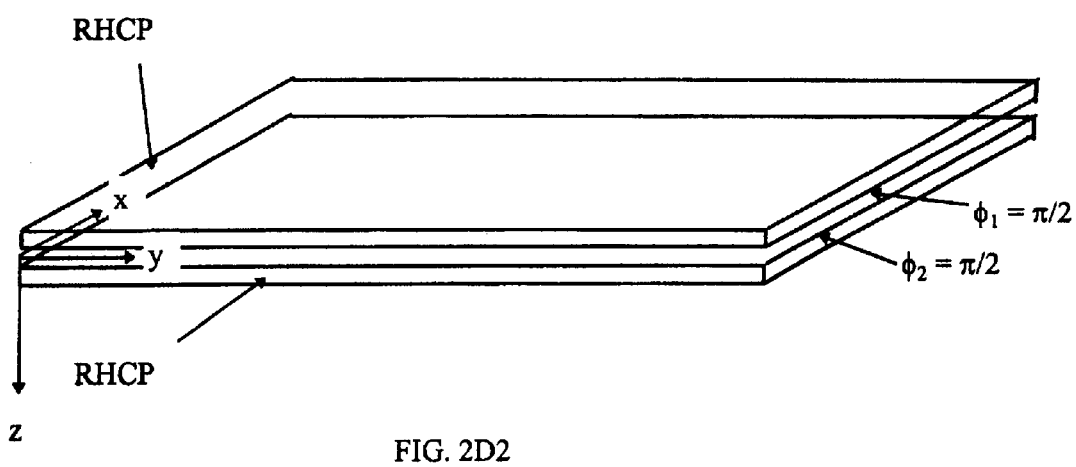
FIG. 2D2

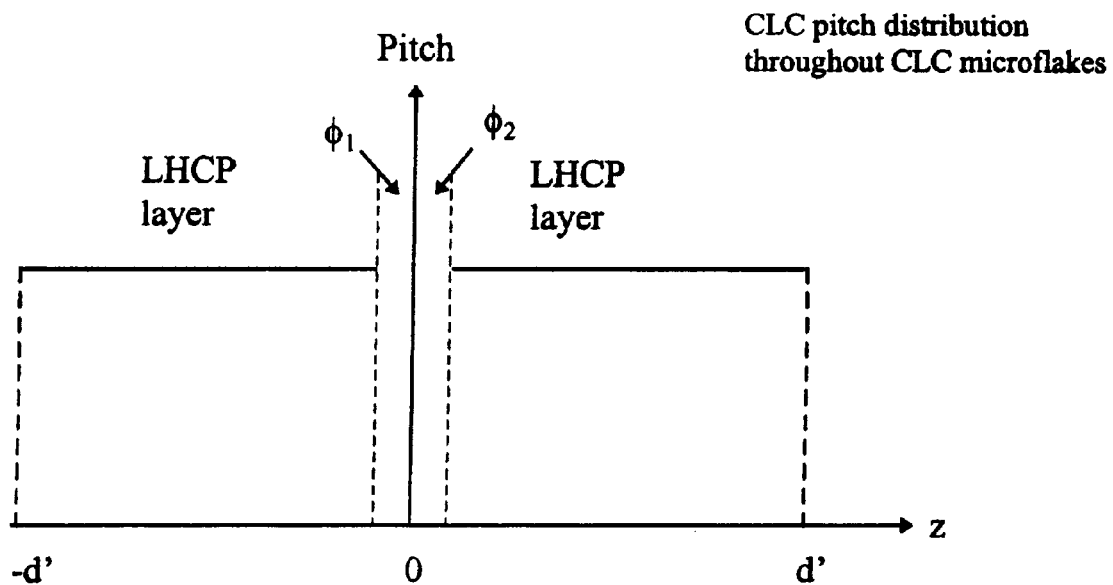
FIG. 2D3
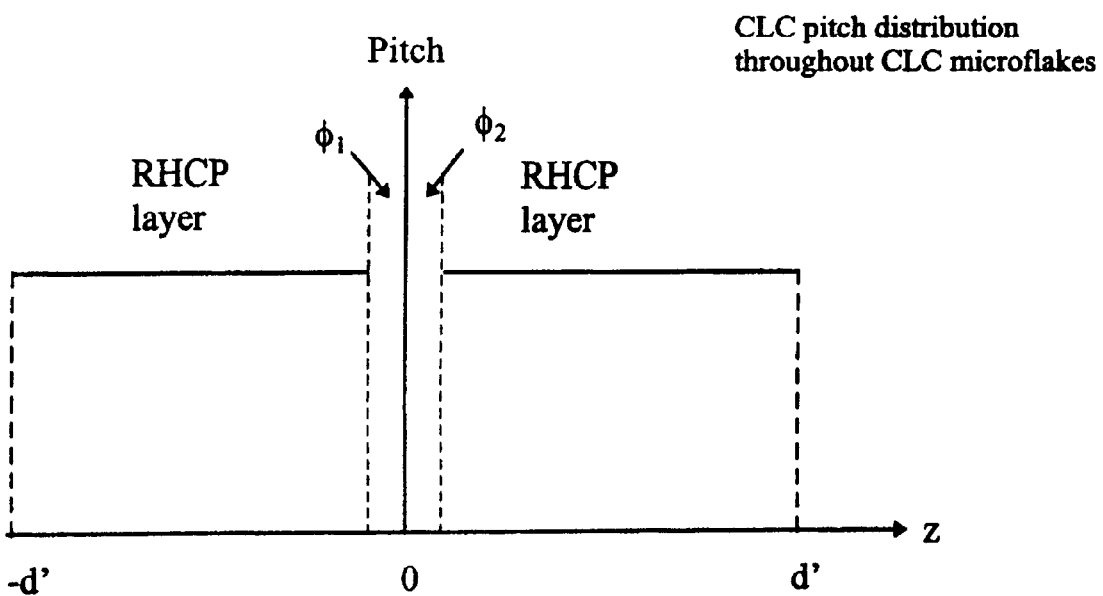
FIG. 2D4

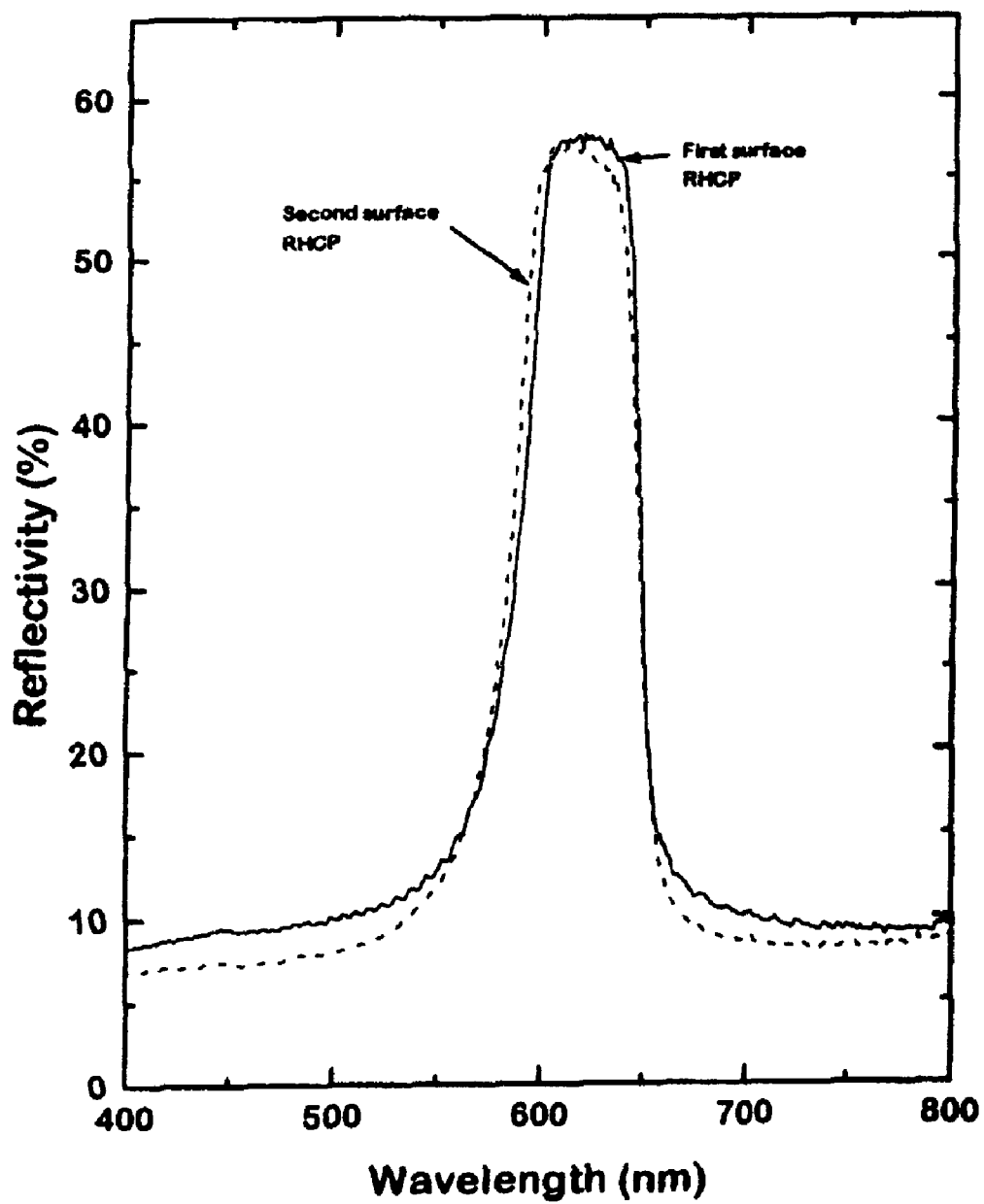
Fig. 2D5

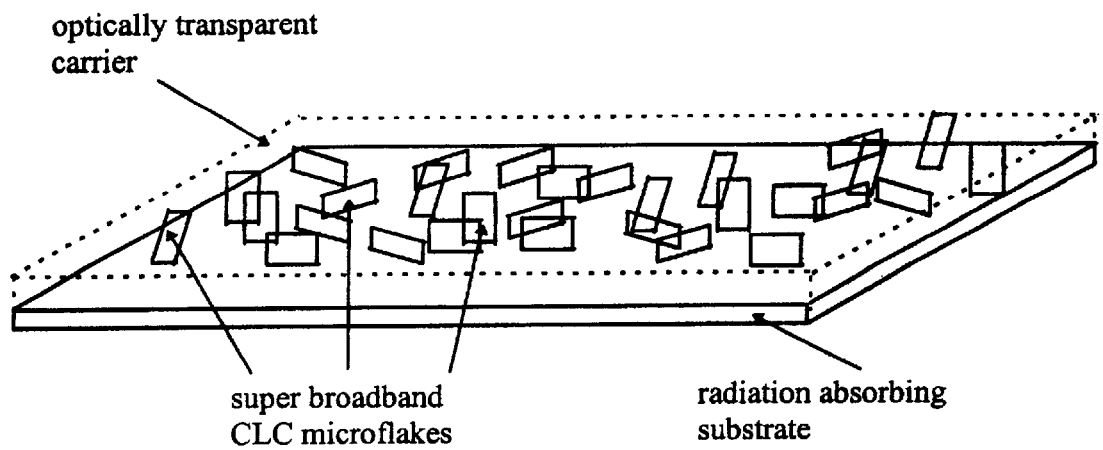
FIG. 3A1
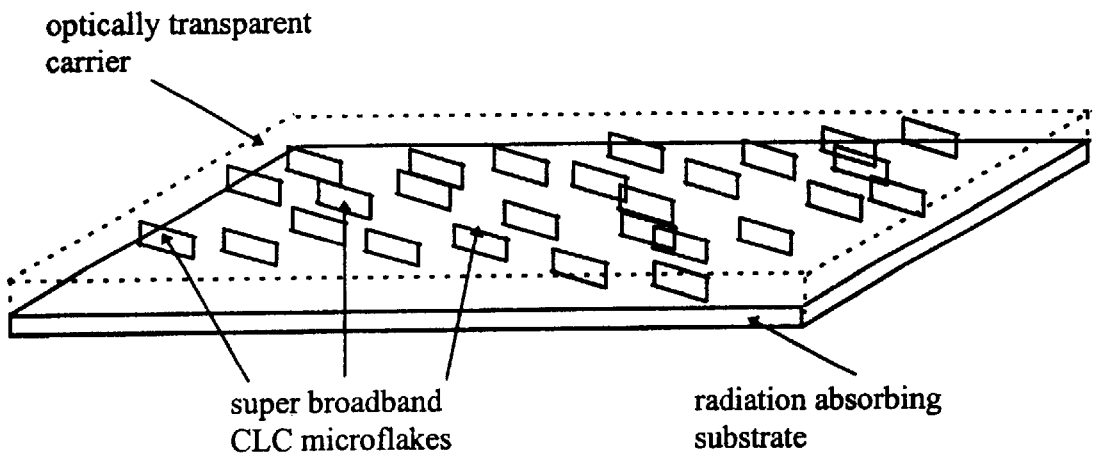
FIG. 3A2

"Double-layer construction"
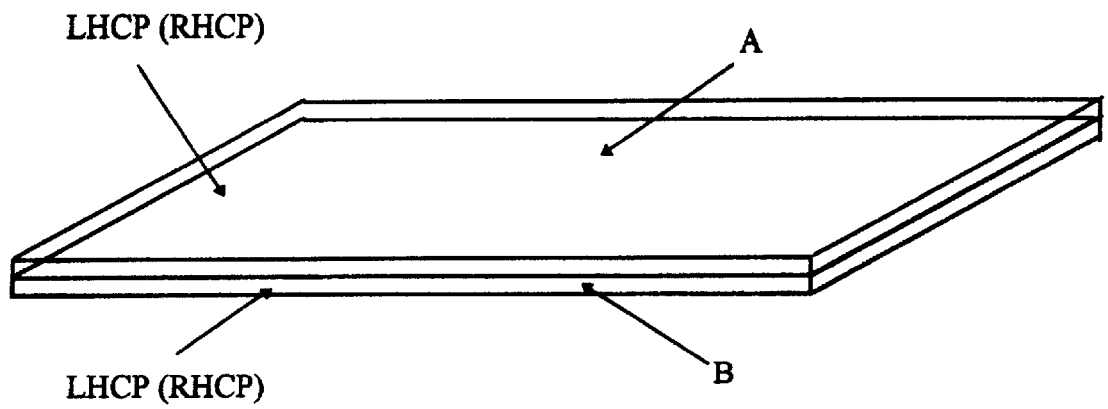
FIG. 3B1
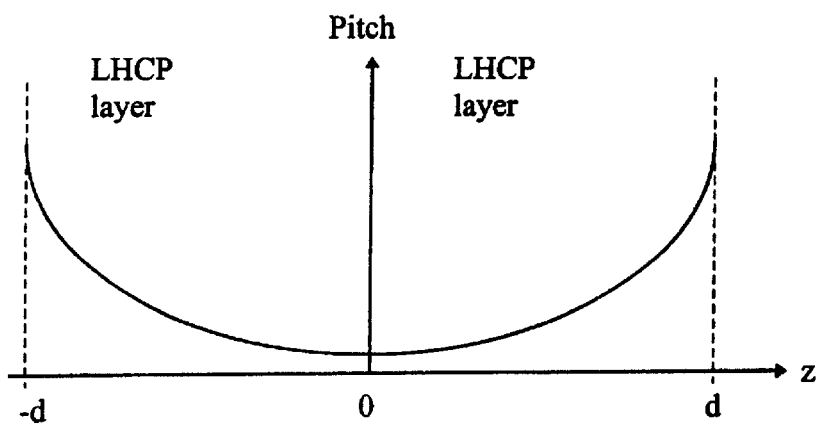
FIG. 3B1 (A)

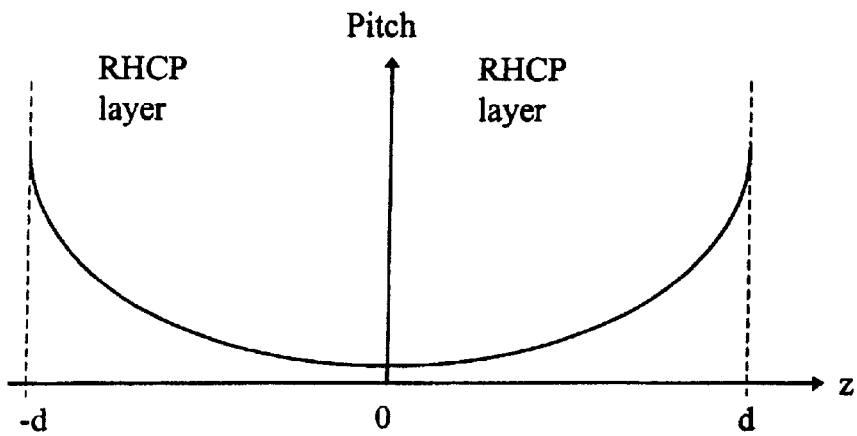
FIG. 3B1 (B)
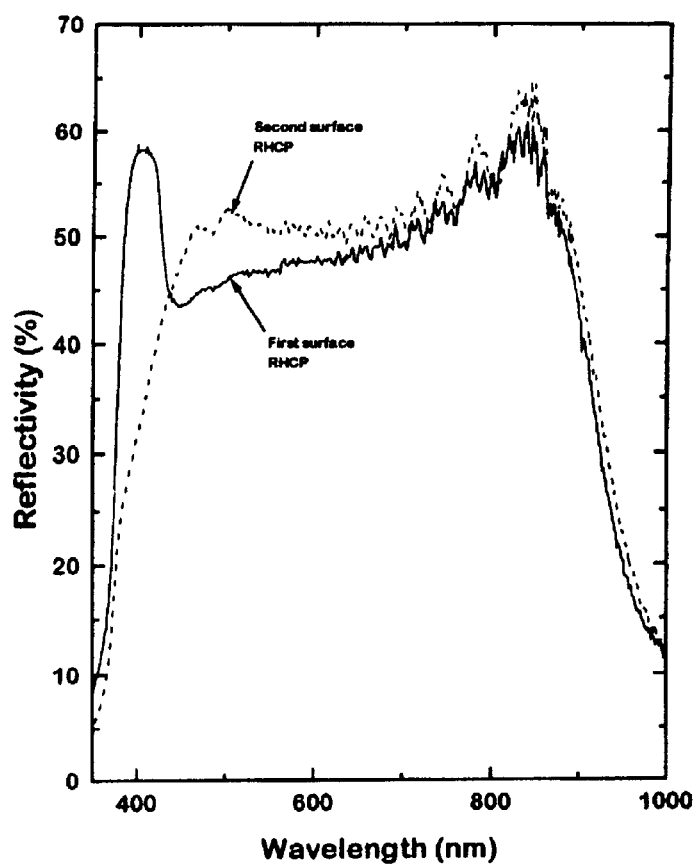
Fig. 3B2

"Double-layer construction"
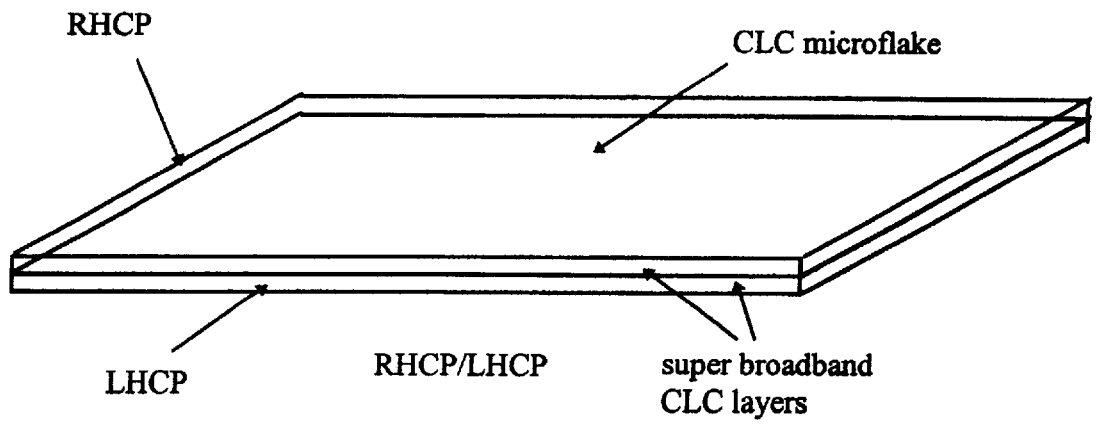
FIG. 3C
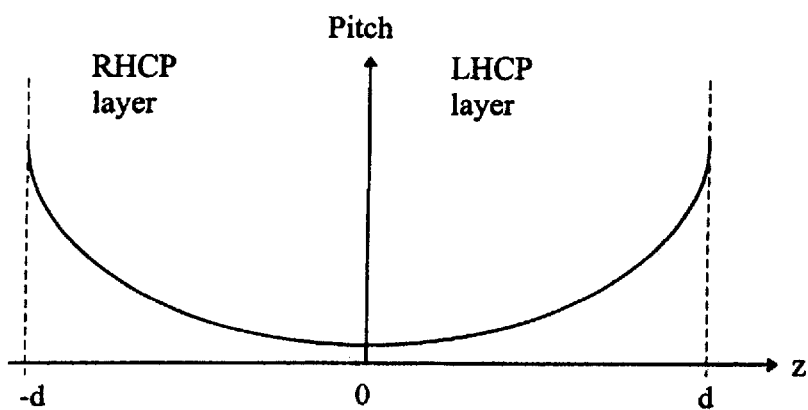
FIG. 3C1 (A)

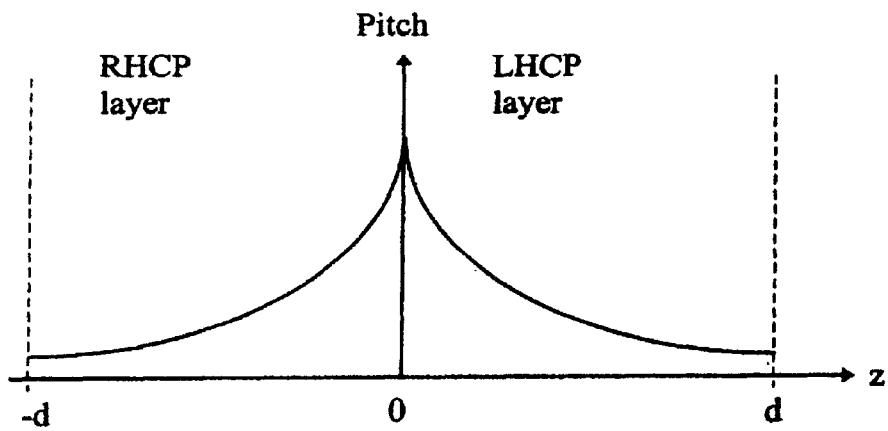
FIG. 3C1 (B)
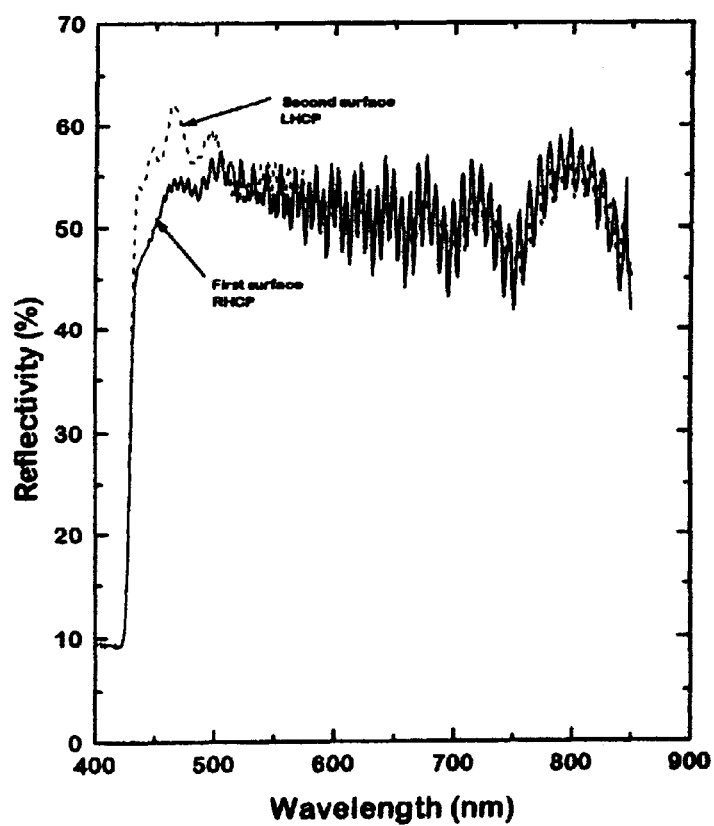
Fig. 3C2

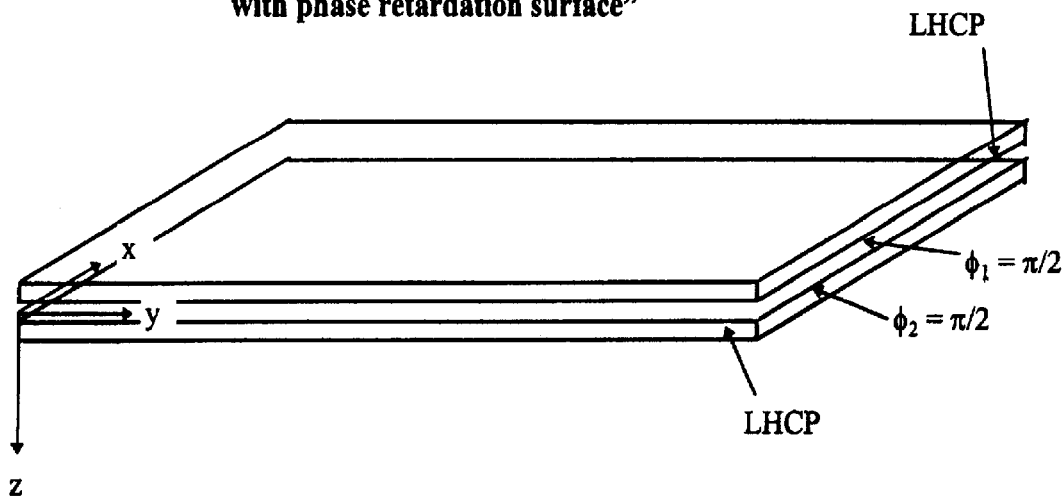
FIG. 3D1
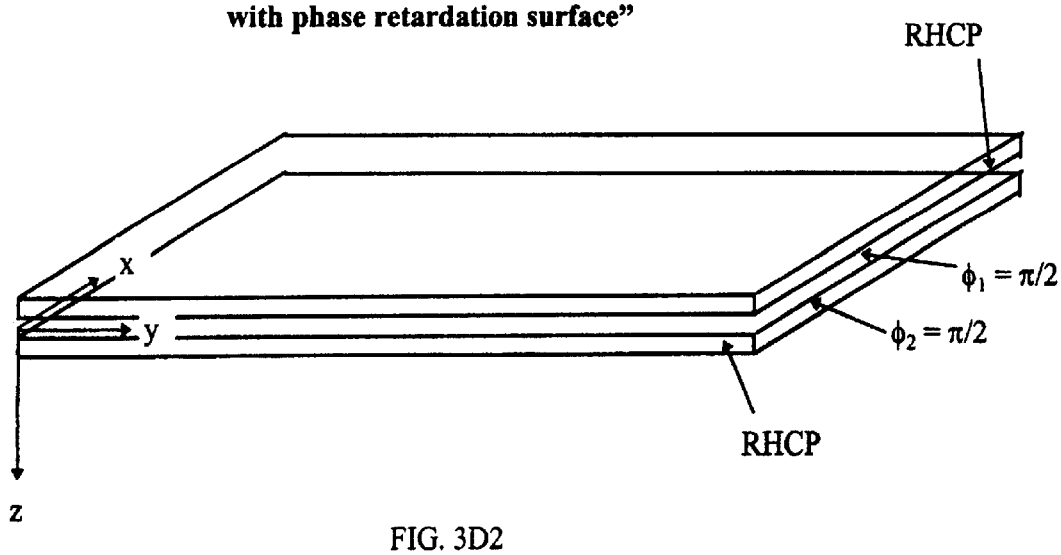
FIG. 3D2

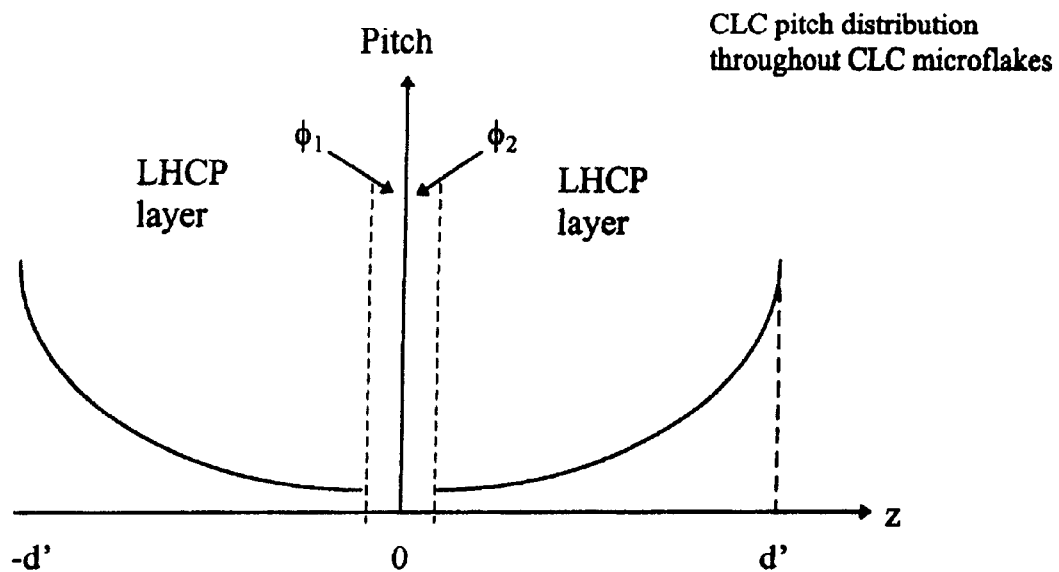
FIG. 3D3
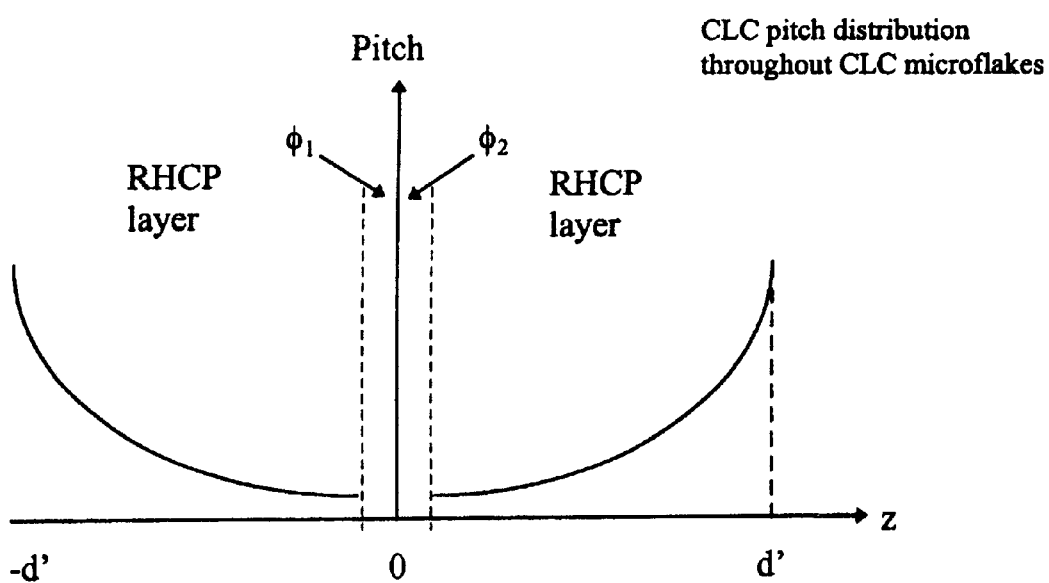
FIG. 3D4

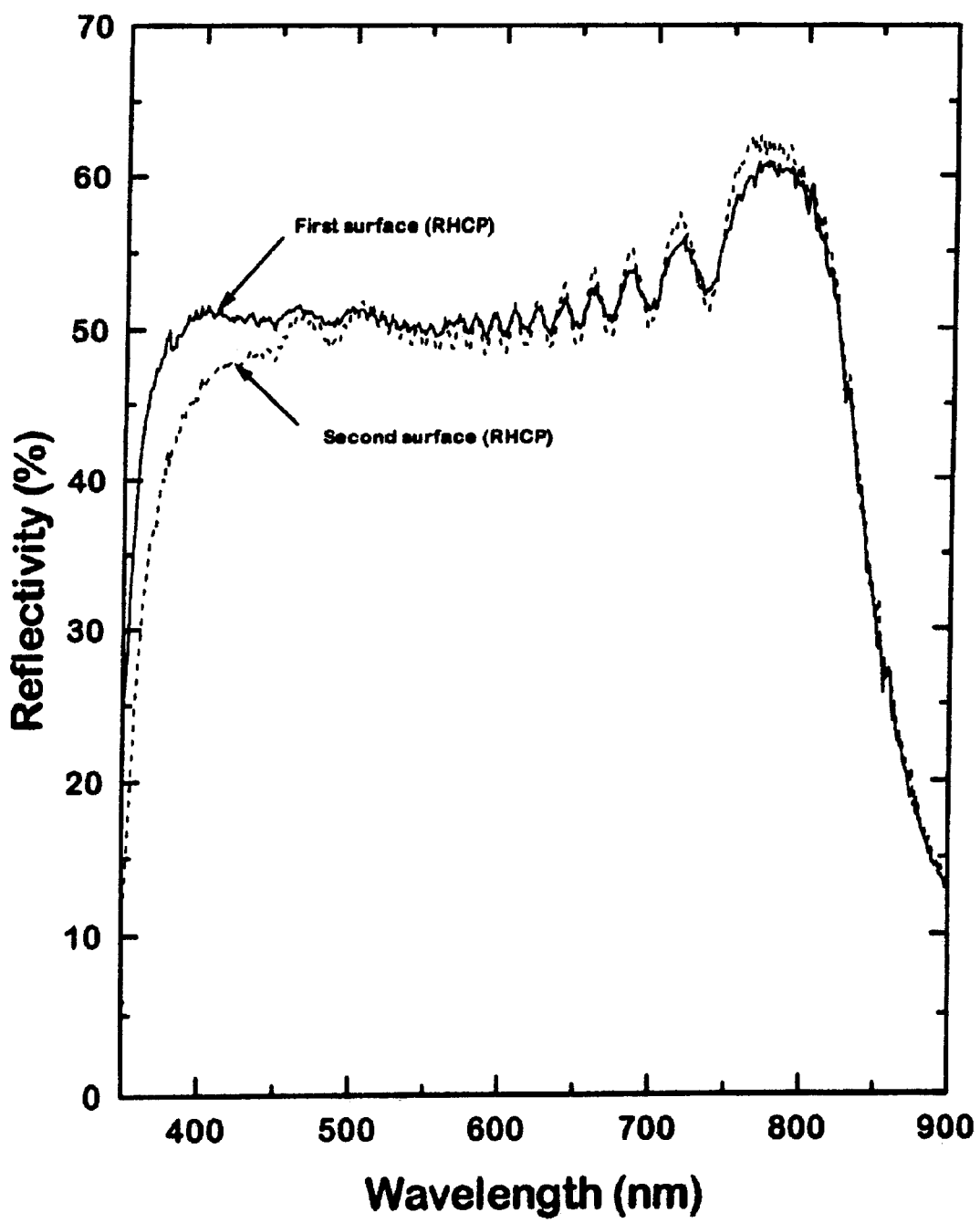
Fig. 3D5

REFLECTIVE FILM MATERIAL HAVING SYMMETRICAL REFLECTION CHARACTERISTICS AND METHOD AND APPARATUS FOR MAKING THE SAME

RELATED CASES

"This is a Continuation-in-Part of: Application Ser. No. 08/787,282 entitled "Cholesteric Liquid Crystal Inks" by Sadeg M. Faris filed Jan. 24, 1997; application Ser. No. 08/743,293 entitled "Liquid Crystal Film Structures With Phase-Retardation Surface Regions Formed Therein And Methods of Fabricating The Same" by Sadeg Faris filed Nov. 4, 1996, now U.S. Letters Patent 6,133,980; Application Ser. No. 08/739,467 entitled "Super Broadband Reflective Circularly Polarizing Material And Method Of Fabricating And Using Same In Diverse Application", by Le Li and Sadeg M. Faris filed Oct. 29, 1996, now U.S. Letters Patent 6,034,753, application Ser. No. 08/715,314 entitled "High-Brightness Color Liquid Crystal Display Panel Employing Systemic Light Recycling And Methods And Apparatus For Manufacturing The Same" by Sadeg Faris filed Sep. 16, 1996, now U.S. Letters Patent 6,188,460; Application Ser. No. 08/550,022 entitled "Single Layer Reflective Super Broadband Circular Polarizer and Method of Fabrication Therfor" by Le Li and Sadeg M. Faris filed Oct. 30, 1995, now U.S. Letters patent 5,691,789; each of said applications being assigned to Reveo, Inc. and incorporated herein by reference in its entirety."

BACKGROUND OF INVENTION

1. Field of Invention

The present invention relates to broadband and spectrally-tuned circularly-polarizing reflective film material having symmetrical reflection characteristics on the upper and lower surfaces thereof, and more particularly to a method and apparatus for making the same in an economical manner.

2. Brief Description of Prior Art

In U.S. Pat. No. 5,364,557, applicant has taught how to make CLC film and pigments (i.e. microflakes) therefrom, for use in various applications. The advantage of using such CLC pigments is that color characteristics can be imparted to images painted and printed therewith by virtue of the reflection polarizing properties of CLC film materials. In color printing, and in the fine arts, CLC color inks are known to possess much higher color saturation and brightness than conventional pigment and dyed based inks. This is in contrast with conventional pigments made from inorganic dyes where the color characteristics thereof are imparted to images painted and printed therewith by virtue of the absorption properties of such materials. A direct consequence of the absorption properties of prior art pigments based on inorganic dyes is that they are characterized by low reflection characteristics over their respective spectral bands. This makes the colors less bright than would otherwise be desired in many applications where a premium is provided for highly reflective paints, surface coatings, and the like, e.g. in the automotive industries, in particular.

However, CLC-based pigments based on the teachings of applicant's U.S. Pat. No. 5,364,557 are not without shortcomings and drawbacks.

For example, applicants have discovered that the reflection characteristics of prior art CLC-based films (and microflakes made therefrom) differ on different sides of the CLC film (and microflakes made therefrom). Consequently, as it is impossible to control microflake surface arrangement during application, the color purity and brightness characteristics of color coatings formed by prior art CLC microflakes are generally non-uniform and inadequate for commercial utility.

Consequently, when using prior art CLC film to manufacture CLC-based pigments as taught in U.S. Pat. No. 5,364,557, it has been impossible to produce color images capturing the colorful aspects of nature in a faithful manner, or color images having color tones and shades demanded by even those endowed with low levels of artistic expression.

Thus there is a great need in the art for improved reflective film material and a method of making the same in a way which avoids the shortcomings and drawbacks of prior art methodologies.

OBJECTS AND SUMMARY OF THE INVENTION

Accordingly, it is a primary object of the present invention to provide reflective film that avoids the shortcomings and drawbacks of prior art reflective films and methods of making the same.

Another object is to provide such reflective film that is circularly polarizing and has improved spectral and band-pass position characteristics for imparting improved color characteristics.

Another object of the present invention is to provide improved light reflective film having a laminated construction, wherein the upper and lower surfaces thereof exhibit symmetrical broadband reflection characteristics over particular regions of the visible band of the electromagnetic spectrum, in order to provide improved light reflectively and brightness when used in the manufacture of colored inks, paints and/or crayons of the present invention Another object of the present invention to provide CLC film material having symmetrical reflection characteristics, wherein the axis of helical pitch of CLC molecules extends along the thickness dimension of the CLC film (i.e. transverse to the surface thereof), and in which the pitch of the helices of the CLC molecules varies in a non-linear (e.g. exponential) manner along the thickness dimension of the CLC film.

Another object of the present invention is to provide such CLC film having a laminated construction, wherein each surface thereof normal to the helical axis exhibits symmetrical broadband reflection characteristics over the visible band of the electromagnetic spectrum, in order to provide improved light reflectively and brightness when used in the manufacture of super-white polarizing inks, paints and/or crayons of the present invention.

Another object of the present invention is to provide such CLC film, wherein the reflection characteristics over the visible band of the electromagnetic spectrum provide improved light reflectively and brightness when used in the manufacture of super-white polarizing inks and/or paints of the present invention.

Another object is to provide CLC film made from both left-handed and right-handed circularly polarizing material having circularly-polarizing reflection characteristics over the entire visible band of the electromagnetic spectrum, for imparting improved color characteristics.

Another object is to provide a method of fabricating circularly polarizing reflective film with symmetrical reflection characteristics, wherein the film exhibits low optical loss propertiesm and high polarizing efficiency, while lending itself to simplified fabrication and low manufacturing cost.

Another object is to provide a method of fabricating broadband CLC film with symmetrical reflection characteristics, in a way which does not employ ultraviolet dye during the manufacture thereof.

Another object is to provide a method of fabricating broadband circularly polarizing reflective film with symmetrical reflection characteristics, wherein the polymerizable CLC being polymerized is exposed to a non-linear (e.g. exponential) intensity gradient of actinic (e.g. UV) radiation by virtue of light loss within the polymerizable CLC medium, thereby causing a non-linear variation in pitch of helices of the CLC molecules therein.

Another object is to provide a method of fabricating super broadband circularly polarizing reflective film using commercially available constituent CLC polymers and liquid crystal material.

Another object is to provide novel forms of coloring media made from polarizing reflective film having symmetrical reflection characteristics.

These and other objects of the present invention will become apparent hereinafter and in the Claims to Invention.

BRIEF DESCRIPTION OF THE DRAWINGS

In order to more fully understand the Objects of the Invention, the following Detailed Description of the Illustrative Embodiments should be read in conjunction with the accompanying Drawings, wherein:

FIG. 2B is a schematic representation of a CLC microflake of the first illustrative of the present invention suspended within the "additive-primary" coloring media coating of FIG. 1 or 2A, illustrating its double-layer laminated construction, wherein each layer is made from the same LHCP or RHCP CLC film material and each surface thereof has substantially the same circularly polarizing reflection characteristics over the visible band portion of the electromagnetic spectrum;

FIG. 2B1 is a schematic representation illustrating one possible pitch distribution of cholesteric liquid crystal molecules along the thickness dimension of an exemplary CLC microflake of a first illustrative embodiment having the double-laminated construction illustrated in FIG. 2B;

FIG. 2B2 is a graphical representation comparing the spectral reflection characteristics of the first and second surface of the spectrally-tuned LHCP (or RHCP) CLC film layers used to fabricate the CLC microflakes suspended within additive primary coloring media shown in FIG. 2B;

FIG. 2C is a schematic representation of a spectrally-tuned CLC microflake of the second embodiment of the present invention suspended within the "additive-primary" coloring media coating of FIG. 1 or 2A, illustrating its double-layer laminated construction, wherein the first CLC layer is made from a layer of RHCP CLC film material, the second CLC layer is made from a layer of LHCP CLC film material, and the first and surfaces thereof have substantially the same circularly polarizing reflection characteristics over the spectrally-tuned band portion of the electromagnetic spectrum;

FIG. 2C1 is a schematic representation illustrating one possible pitch distribution of cholesteric liquid crystal molecules along the thickness dimension of a first exemplary embodiment of the spectrally-tuned CLC microflake of the present invention having the double-layer laminated construction illustrated in FIG. 2C;

FIG. 2C2 is a graphical representation comparing the spectral reflection characteristics of the first and second surfaces of the spectrally-tuned RHCP and LHCP CLC film layers used to fabricate the spectrally-tuned CLC microflakes suspended within the additive primary coloring media shown in FIG. 2C;

FIG. 2D1 is a schematic representation of a spectrally-tuned CLC microflake of the third embodiment of the present invention suspended within the "additive-primary" coloring media coatings of FIG. 1 or 2A, illustrating its double-layer laminated construction, wherein the first CLC layer is made from a first layer of LHCP CLC film material having a first phase retardation surface formed therein, the second CLC layer is made from a second layer of LHCP CLC film material having a second phase retardation surface formed therein adjacent the first phase retardation surface, and the first and second surfaces thereof have substantially the same circularly polarizing reflection characteristics over the spectrally-tuned portion of the electromagnetic spectrum;

FIG. 2D2 is a schematic representation of a spectrally-tuned CLC microflake of the fourth embodiment of the present invention suspended within the "additive-primary" coloring media coatings of FIGS. 1 or 2A, illustrating its double-layer laminated construction, wherein the first CLC layer is made from a first layer of RHCP CLC film material having a first phase retardation surface formed therein, and the second CLC layer is made from RHCP CLC film material having a second phase retardation surface formed therein adjacent the first phase retardation surface, and the first and second surfaces thereof have substantially the same circularly polarizing reflection characteristics over the spectrally-tuned band portion of the electromagnetic spectrum;

FIG. 2D3 is a graphical representation of the helical pitch variation of liquid crystal molecules along the thickness dimension of a first embodiment of the spectrally-tuned CLC microflake having the construction shown in FIG. 2D1 or 2D2;

FIG. 2D4 is a graphical representation of the helical pitch variation of liquid crystal molecules along the thickness dimension of a second embodiment of the spectrally-tuned CLC microflake having the construction shown in FIG. 2D1 or 2D2;

FIG. 2D5 is a graphical representation comparing the reflection characteristics of the first and second surfaces of the spectrally-tuned RHCP CLC layers used to fabricate the spectrally-tuned CLC microflakes used to fabricate the spectrally-tuned CLC microflakes illustrated in FIG. 2D1 or 2D2;

FIG. 3A1 is a schematic representation of a thin "non-specular reflective" coating of "super-white" coloring media of the present invention comprising super broadband CLC microflakes suspended within an optically transparent carrier medium applied to a radiation absorbing substrate, and FIG. 3A2 is a schematic representation of a thin "quasi-specular reflective" coating of "mirror-like" coloring media of the present invention comprising super broadband CLC microflakes suspended within an optically transparent carrier medium applied to a radiation absorbing substrate;

FIG. 3B1 is a schematic representation of a super broadband CLC microflake of the first embodiment of the present invention suspended within the "super-white" and mirror-like coloring media coatings of FIGS. 3A1 and 3A2, illustrating its double-layer laminated construction, wherein each layer is made from the same LHCP or RHCP CLC film material and the external surfaces thereof have substantially the same circularly polarizing reflection characteristics over the visible band of the electromagnetic spectrum;

FIG. 3B1(A) is a schematic representation illustrating one possible pitch distribution of cholesteric liquid crystal molecules through the thickness dimension of a first exemplary super broadband LHCP CLC microflake having the double-layer laminated construction illustrated in FIG. 3B;

FIG. 3B1(B) is a schematic representation illustrating the pitch distribution of cholesteric liquid crystal molecules through the thickness dimension of a second exemplary super broadband RHCP CLC microflake having the double-layer laminated construction illustrated in FIG. 3B;

FIG. 3B2 is a graphical representation comparing the spectral reflection characteristics of the first and second surfaces of the super-broad band RHCP CLC film layers used to fabricate the super broadband CLC microflakes suspended within the super-white and mirror-like coloring media shown in FIGS. 3A1 and 3A2, for producing "super-white" and "mirror-like" color effects, respectively;

FIG. 3C is a schematic representation of a super broadband CLC microflake of the second embodiment of the present invention suspended within the "super-white" coloring media coating of FIG. 3A or 3B, illustrating its double-layer laminated construction, wherein the first CLC layer thereof is made from a layer of super broadband RHCP CLC film material, the second CLC layer is made from a layer of super broadband LHCP CLC film material, and the first and surfaces thereof have substantially the same circularly polarizing reflection characteristics over the visible band portion of the electromagnetic spectrum;

FIG. 3C1(A) is a schematic representation illustrating the pitch distribution of cholesteric liquid crystal molecules along the thickness dimension of a first exemplary super broadband CLC microflake having the double-layer laminated construction illustrated in FIG. 2C;

FIG. 3C1(B) is a schematic representation illustrating the pitch distribution of cholesteric liquid crystal molecules along the thickness dimension of a second exemplary super broadband CLC microflake having the double-layer laminated construction illustrated in FIG. 2C;

FIG. 3C2 is a graphical representation comparing the spectral reflection characteristics of the first and second surface of the super broadband RHCP and LHCP CLC film layers used to fabricate the super broadband CLC microflakes suspended within the super-white and mirror-like coloring media shown in FIGS. 3A1 and 3A2, for producing "super-white" and mirror-like color effects, respectively;

FIG. 3D1 is a schematic representation of a super broadband CLC microflake of the third embodiment of the present invention suspended within the "super-white" and mirror-like coloring media coatings of FIGS. 3A and 3B, respectively, illustrating its double-layer laminated construction, wherein the first CLC layer thereof is made from a first layer of LHCP CLC film material having a first phase retardation surface formed therein, the second CLC layer thereof is made from a second layer of LHCP CLC film material having a second phase retardation surface formed therein, and the first and second surfaces thereof have substantially the same circularly polarizing reflection characteristics over the visible band portion of the electromagnetic spectrum;

FIG. 3D2 is a schematic representation of a super broadband CLC microflake of the fourth embodiment of the present invention suspended within the "super-white" or mirror-like coloring media coatings of FIGS. 3A and 3B, respectively, illustrating its double-layer laminated construction, wherein the first CLC layer is made from a first layer of RHCP CLC film material having a first phase retardation surface formed therein, the second CLC layer is made from a second layer of RHCP CLC film material having a second phase retardation surface formed therein, and the first and second surfaces thereof have substantially the same circularly polarizing reflection characteristics over the visible band portion of the electromagnetic spectrum;

FIG. 3D3 is a graphical representation of the helical pitch variation of liquid crystal molecules along the thickness dimension of a first embodiment of a super broadband CLC microflake hereof having the laminated construction shown in FIG. 3D1 or 3D2;

FIG. 3D4 is a graphical representation of the helical pitch variation of liquid crystal molecules along the thickness dimension of a second embodiment of a super broadband CLC microflake hereof having the laminated construction shown in FIG. 3D1 or 3D2; and FIG. 3D5 is a graphical representation comparing the reflection characteristics of the first and second surfaces of the first and second super broadband CLC layers comprising a super broadband CLC microflake used to fabricate the super broadband CLC microflakes of FIG. 3D1 or 3D2 suspended within the super-white and mirror-like coloring media shown in FIG. 3A1 and 3A2, for producing "super-white" and "mirror-like" color effects, respectively.

DETAILED DESCRIPTION OF THE ILLUSTRATIVE EMBODIMENTS OF THE PRESENT INVENTION

Figure 1:
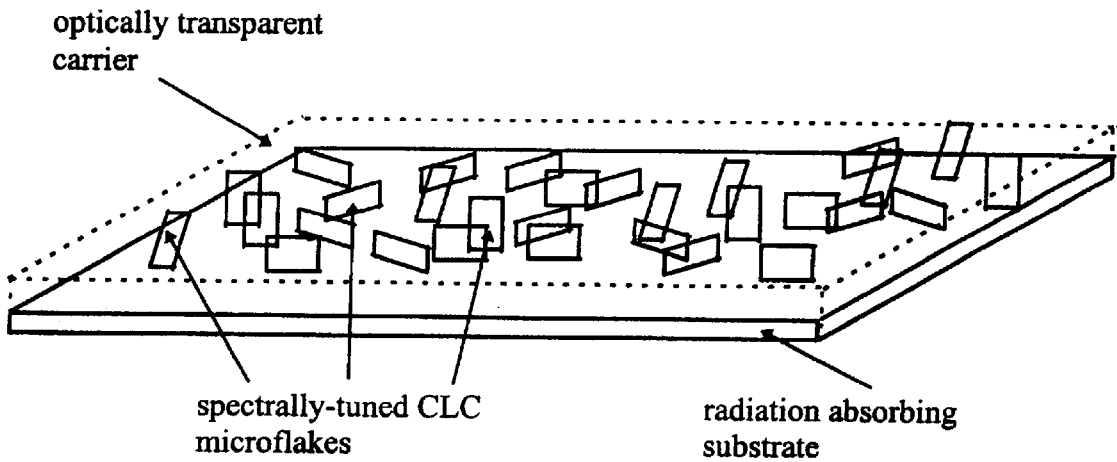
FIG. 1 is a schematic representation of a thin "non-specular reflective" coating of "additive-primary" coloring media of the present invention applied comprising spectrally-tuned CLC microflakes suspended within an optically transparent carrier medium applied to radiation absorbing substrate.

The illustrative embodiments of the present invention shall be described in connection with the accompanying Drawings, in which like structures and elements in the figures thereof shall be indicated by like reference numerals.

Overview on the Symmetrical Reflective Film of the Present Invention

In general, the reflective film of the present invention has many applications. One application, in particular, which shows great commercial promise is the manufacture of "coloring media" from the reflective film of the present invention. By virtue of its unique reflection characteristics which will be described in detail hereinafter, the reflective film of the present invention can be used to manufacture "additive primary" (i.e. "red", "green" and "blue") coloring media, as well as "super-white" (i.e. Magnesium Oxide White) coloring media. Such coloring media may be realized in the form of paint, ink, crayon (wax or chalk), or any other form of media capable of being applied as thin coatings on radiation absorbing substrates (i.e. surfaces) so as to impart a broad range of color characteristics thereto, hitherto unachievable using prior art technologies.

Each type of coloring media (i.e. additive primary and super-white) manufacturable from the reflective film of the present invention comprises two primary subcomponents, namely: microscopically small flakes or platelets of non-absorbing light reflective film (referred to hereinafter as "reflective microflakes)"; and an optically transparent carrier (or host) material in which the microflakes are suspended prior to and after the carrier material has been applied to a radiation absorbing substrate and cured (i.e. dried). The primary difference between the inks, paints, chalk, wax and the like resides in the particular properties of the optically transparent carrier medium used to carry and suspend the microflakes (i.e. pigments) of such applied coatings.

In the preferred embodiments of the present invention, each reflective microflake is fabricated from reflective film having a laminated construction. Such reflective film consists of two identical film layers laminated together to ensure that the reflection characteristics along the front and back surfaces of the film are virtually identical. As the reflective microflakes are made by fracturing the reflective film of the present invention, the reflection characteristics along the front and back surfaces of each microflake are also virtually identical. By virtue of such symmetrical reflection characteristics, incident light of a particular band of wavelengths (and polarization state) is guaranteed to reflect the way and to the same degree at each location along an applied coloring media coating, independent of which surface of each microflake faces incident light. For the case of additive primary type coloring media, such symmetrical characteristics provide for improved color uniformity and apparent brightness of the applied coating thereof under uniform lighting conditions. For the case of super-white type coloring media, such symmetrical characteristics provide for improved whiteness and brightness uniformity under uniform lighting conditions.

When applied to a radiation absorbing substrate, the reflective microflakes suspended within the carrier medium stack up in either single or multiple layers depending on the thickness of the carrier medium. By virtue of the fact that the microflakes have either an irregular width and length dimensions or a shape, there is a natural tendency for many of the microflakes to not fall within a single plane, but instead to overlap each other and also to form interstices between the microflakes. Consequently, over each microscopically small region of applied coloring media coating hereof, there exists many surface discontinuities at each microflake layer. This causes incident light of a particular bandwidth to undergo non-specular reflection within the applied coating. In the case of super-white coloring media, such non-specular reflection characteristics are essential for an applied coating of super-broad band microflakes to impart "super-white" color characteristics under broadband visible lighting conditions. In the case of additive primary coloring media, such non-specular reflection characteristics are required for an applied coating of broadband microflakes to avoid producing "glare" with ultra-bright additive primary (i.e. red, green and blue) color effects. In the case of additive primary coloring media of the present invention, the front and back surfaces of each microflake have super-high reflection characteristics tuned over the particular region of the visible spectrum associated with the colors red, green or blue, as the case may be.

Super-white coloring media of the present invention has color characteristics similar to and as visually striking as conventional Magnesium Oxide inks and paints used in the visual and graphic arts. In general, the super-white coloring media of the present invention can be in either a liquid or solid state at room temperature when they are applied to substrates preferably having radiation absorbing characteristics. When applied as a thin coating to a radiation absorbing substrate at room temperature, and viewed under broadband lighting conditions, the coating exhibits super-white color characteristics similar to conventional Magnesium Oxide based inks and paints. When used with coloring media having additive primary color characteristics, artists, painters, computer-driven printers and the like can form images which, after drying at room temperature, retain remarkable color characteristics hitherto unattainable using prior art inks and paints taught in applicant's prior U.S. Pat. No. 5,364,557.

When realized in the form of an ink or paint, the "super-white" and "additive primary" coloring media is in a liquid state at room temperature prior to application, and after applied as a coating and dried, exists in the form of a solid state coating. When realized in the form of a crayon (e.g. wax or chalk), the super-white and additive primary colorant hereof is in a solid state at room temperature prior to application, and after application as a coating, remains in its solid state at room temperature.

In general, a number of different film technologies can be used to realize the reflective film of the present invention, in which the reflection characteristics along the front (top) and back (bottom) surfaces are substantially the same over the visible band. As will described in great detail hereinafter, broadband and super broadband cholesteric liquid crystal (CLC) film are the preferred materials for manufacturing reflective film of the present invention having symmetrical reflection characteristics. It is understood, however, that there exist other types of broadband reflective film constructions that can be suitably used to carry out the broader aspects of the present invention disclosed herein without the use of CLC material. An example of a broadband reflective film construction not based on CLC material is disclosed in published International PCT Publication Number WO 95 95/17692 by the 3M Company. As disclosed therein, broadband reflective film can be constructed by laminating alternating layers of polymeric material having different refractive indices. The optical characteristics of the individual polymeric layers cause the multiple layer laminate to act as a reflecting polarizer that will transmit the polarization component of incident light that is correctly oriented with respect to its transmission axis.

Alternatively, suitable broadband film might be constructed using reflective material such as interference films, holographic reflective films (e.g. reflection-type volume holograms), and the like.

In the preferred illustrative embodiments, the coloring media hereof embodies CLC-based reflective microflakes (hereinafter "CLC microflakes") which are a species of the reflective microflakes described above. The coloring media is fabricated using a novel process comprising the steps of: (A) producing a laminated CLC film material having a thickness within a predetermined thickness range, and symmetrical polarization-reflection characteristics that are associated with the desired color to be produced (e.g. red, green, blue or super-white); (B) fracturing the laminated CLC film (either free-standing or on a support substrate) into laminated CLC microflakes of various dimensions; (C) selecting an optically transparent carrier (or host) medium for suspending the laminated CLC microflakes; and (D) adding the laminated CLC microflakes to the selected carrier medium in appropriate amounts in order to produce the desired coloring media.

The procedure for applying the coloring media to a substrate having absorption characteristics over the visible band involves carrying out the additional steps of: (E) preparing/treating the substrate (i.e. surface) to which the coloring media is to be applied; and (F) applying CLC Coloring media to the treated substrate. The CLC polymer films produced during Step A have liquid crystal molecules arranged along helical axes normal (transverse) to the surface of the reflective film and thus each laminated CLC microflake produced during Step B also has liquid crystal molecules arranged along the helical axis normal to the surface of the film. Each of these Steps will be described in greater detail hereinbelow.

Manufacturing CLC Film Having Symmetrical Reflection Characteristics

While the preferred technique to be described below is for manufacturing broadband and super broadband CLC film having symmetrical polarization-selective reflection characteristics, it is understood that it also can be used to manufacture narrow-band film with symmetrical reflection characteristics. Moreover, this manufacturing technique is not limited to CLC-based film material but can be used in connection with: interference film of the type disclosed in, for example, in International PCT Publication Number WO 95 95/17692; holographic reflective film material; and the like.

Step A: Manufacturing CLC Film Having Symmetrical Polarization-Selective Reflection Characteristics using Unidirectional UV Illumination and Lamination Techniques Free-standing CLC film having symmetrical (polarization-selective) reflection characteristics can be made using the below described film fabrication method. This method involves carrying out the following sequence of substeps, namely: (Substep A1) preparing a mixture of polymerizable (cross-linkable) liquid crystal film material; (Substep A2) treating the surface of the substrate upon which the liquid crystal material is to be deposited; (Substep A3) applying the liquid crystal material to the surface-treated substrate to provide a layer of polymerizable liquid crystal film thereon; (Substep A4) annealing the layer of liquid crystal film; (Substep A5) curing (i.e. polymerizing) the deposited layer of liquid crystal film material by (i) exposing one surface thereof to UV light so that a non-linear intensity is produced within the film; (Substep A6) removing the layer of cured liquid crystal film from the substrate to produce a first sheet of free-standing layer of cholesteric liquid crystal film having "asymmetrical" polarization reflection characteristics; (Substep A7) repeating Substeps (A2) through (A6) to produce a second sheet of free-standing layer of cholesteric liquid crystal film having "asymmetrical" polarization reflection characteristics similar to that of the first sheet of CLC film; and (Substep A8) laminating the first and second CLC film sheets together to form a laminated CLC film structure such that the first and second surfaces thereof each have the same or substantially the same polarization reflection characteristics.

Substep (A1): Preparing a Mixture of Liquid Crystal Material

The general method of fabricating the broadband circularly polarizing material of the present invention involves mixing together the following constituents: (i) a polymerizable liquid crystal material having a cholesteric order (e.g. side-chain cyclic liquid crystal polysiloxanes); (ii) a non-polymerizable material may or may not have a nematic liquid crystal order; and (iii) an amount of suitable photoinitiator which satisfies the above-described "super broadband" fabrication constraints. All the compounds are weighed according to a preset ratio and mixed thoroughly. After the liquid crystal material is mixed, it should be degassed in vacuum, preferably at an elevated temperature not to exceed 80° C. The purpose of the degassing process is to remove air trapped inside the mixed material.

In the illustrative embodiments of the present invention illustrated in the Examples 1–10 described herein, the "polymerizable" CLC materials used in the manufacturing process are commercially available from Wacker GmbH, Germany, whereas the non-polymerizable nematic liquid crystal materials for use with the above polymerizable CLC materials are commercially available from EM Industries, Germany, as E31LV and E7. When the polymerizable CLC materials are exposed to ultraviolet radiation in the presence of a photoinitiator, the polymerizable CLC materials are polymerized by way of a cationic polymerization process. The polymerizable CLC material is available in blue (CC4039L) and red (CC4070L) compounds. A first polymerizable CLC material is available in blue compounds (CC4039L) and (CC4039R) having a left-handed (LH) spiral structure and right-handed (RH) spiral structure, respectively. The second polymerizable CLC material is available in a red compound (CC4070L) having a left-handed (LH) spiral structure. The blue compound reflects LHCP light at 390 nm and the red compound reflects LHCP light at 690 nm after UV curing at 70° C. When the blue compound (CC4039R) is mixed with a left-handed polymerizable CLC, like CC4039L, in a suitable ratio, and cured at 70° C., then the resulting CLC film reflects RHCP light. Before curing, the raw CLC material exhibits a rubbery state at room temperature and turns to liquid at around 70° C.

Substep (A2): Treating the Substrate Upon which the Liquid Crystal Material is to be Deposited After the liquid crystal material is prepared, it is deposited upon the surface of a substrate. A variety of substrates are available for use in practicing the present invention including, for example, plain glass, ITO coated glass, plastic substrates, polyvinyl alcohol (PVA), PET, polycarbonate (PC), etc. However, prior to deposition, the substrate surface must be first cleaned via, e.g., ultrasonic bath, and thereafter an alignment layer (e.g. polyimide or SiO coating) must be applied to the cleaned surface. The function of the alignment layer is to force the liquid crystal molecules to align according to a desired molecular ordering (e.g., planar ordering) during the polymerization stage of the fabrication process. Three different surface treatment procedures will be described below.

When using a substrate such as plain glass, ITO coated glass, plastic substrates (e.g. PVA, PET, polycarbonate, etc), surface treatment can be carried out by applying an alignment layer in the form of a coating of polyimide (e.g., 7311SE from Nissan Chemical) to the surface of the substrate by way of spinning, dipping, offset printing, etc. After the coating is applied, the substrate surface is baked at an elevated temperature, e.g., 180° C. After baking, the coated substrate is mechanically rubbed in a manner known in the art.

When using a substrate made from plain glass or ITO coated glass, plastic substrates (e.g. Polyvinyl alcohol (PVA), PET, Polycarbonate (PC), etc.), then surface treatment can be carried out by first cleaning the surface of the substrate, and then obliquely depositing, in vacuum, an alignment layer in the form of a thin coating of SiO deposited upon the surface of the substrate.

When using suitable substrates made from plastic, then substrate treatment can be carried out by first cleaning the surface thereof, and then mechanically rubbing the same in the manner known in the art.

Substep (A3): Applying the Liquid Crystal Material to the Treated Substrate in Order to Provide a Layer of Polymerizable Liquid Crystal Film on the Substrate In general, a variety of different techniques may be used to apply the liquid crystal material to the treated substrate in order to provide a layer of polymerizable liquid crystal film on the substrate. Any one of the film forming techniques described below can be used for this purpose.

Providing a Layer of Polymerizable Liquid Crystal Film on the Treated Substrate by Filling Liquid Crystal Material in a Vacuum Chamber The classical method used to manufacture LCD panels can be used to provide a thin layer of polymerizable liquid crystal film on the treated substrate. This method involves making a open-ended "hollow cell" by placing spacers (e.g. realized as beads, optical fiber, or mylar) of desired thickness between a pair of surface-treated substrates. Once constructed, the cell is sealed with a proper epoxy (e.g., UV glue) around its three edges, leaving one side open for carrying out liquid crystal filling operations. Thereafter, the cell and prepared liquid crystal mixture are placed inside a vacuum chamber in a separated relationship, and then the vacuum chamber is evacuated to a point where a sufficient vacuum is reached, such as $10_{-2}$ Torr. At this stage, the open side of the cell is merged into the liquid crystal mixture and then the vacuum valve is released, allowing air to be introduced into the vacuum chamber. This causes the liquid crystal mixture to flow into the cell due to the pressure difference existing on the inside and outside thereof, to provide a layer of polymerizable liquid crystal film on the treated substrate surfaces of the cell.

Providing a Layer of Polymerizable Liquid Crystal Film on the Treated Substrate by Filling Liquid Crystal Material by Capillary Action Prior to liquid crystal filling operations, a hollow cell is made from a pair of surface treated substrates in a manner similar to the method described above. The cell thickness is controlled using spacers in the same way described above. The primary difference of this technique is that the two opposite sides of the cell, or all the four edges thereof, must be open. After the cell is constructed and sealed, the cell is placed on a hot plate and heat to a suitable temperature. In some examples of manufacture, room-temperature will be suitable for this technique. When properly heated, the liquid crystal mixture is brought into physical contact with one of the cell edges. Due to capillary effect, the liquid crystal material is sucked into the cell to provide a layer of polymerizable liquid crystal film on the treated substrate surfaces of the cell.

Providing a Layer of Polymerizable Liquid Crystal Film on the Treated Substrate by Sandwiching Film in a Vacuum According to this method, a layer of liquid crystal material is spread evenly onto the treated surface of a first (glass or plastic) substrate. Thereafter, the substrate with the liquid crystal layer is placed inside a vacuum chambered oven, along with a second substrate with a treated surface. The treated surface of the second substrate should be supported above liquid crystal layer on the first substrate surface, by way of a suitable support mechanism controllable by means disposed outside the vacuum chamber. The interior temperature of the oven is then increased until the liquid crystal material has achieved a desirably low viscosity. At this stage, the vacuum chamber is evacuated and thereafter the second substrate is allowed to fall down directly on top of the liquid crystal layer disposed upon the treated surface of the first substrate. A sufficient time is then allowed to lapsed in order to allow the two treated substrates to make contact with the liquid crystal material sandwiches therebetween. Finally, the vacuum within the oven is slowly removed until the pressure within the oven reaches an ambient pressure. Using this method, large size sheets of liquid crystal material can be provided to a treated substrate.

Providing a Layer of Polymerizable Liquid Crystal Material on a Treated Substrate by Lamination This method is extremely suitable for plastic-plastic or plastic-glass substrates. According to this technique, substrates with treated surface are prepared. Then the liquid crystal mixture is applied at one edge of a first substrate which can be made of either plastic or glass material. The first substrate is then covered with a second substrate, with the applied liquid crystal mixture disposed therebetween at one end thereof. The first and second substrates are then passed through a laminator whose gap has been adjusted to the desired value to achieve a suitable thickness of liquid crystal material between the pair of laminated substrates.

Providing a Layer of Polymerizable Liquid Crystal Film on the Treated Substrate by Roller Coater This method is similar to the lamination method described above in that two substrates (preferably, plastic-plastic or plastic-glass) with treated surfaces are prepared. Then liquid crystal mixture is applied at one of the edges of the first substrate. Then, the treated surface of the second substrate is placed on top of the treated surface of the first substrate. Then a platform with a flat and smooth surface, such as a glass plate, is placed over the second substrate and then a roller is rolled over the sample beginning at the edge with liquid crystal mixture sandwiches therebetween. The roller pressure can be adjusted to the desired value to achieve a suitable thickness of liquid crystal material between the pair of substrates.

Providing a Layer of Polymerizable Liquid Crystal Film on the Substrate by Knife Coating This technique employs a pair of surface treated substrates which can be realized using any combination of materials (e.g. plastic-plastic, plastic-glass, and glass-glass combinations). After the surfaces of the substrates are treated in the manner described above, a thin uniform film of liquid crystal material is evenly applied to the treated surface of the first substrate using a knife coating technique, described and illustrated in at applicant's U.S. Pat. No. 5,364,557, supra. Thereafter, the treated surface of the second substrate is placed on top of the applied liquid crystal film using any one of the techniques described above.

Substep (A4): Annealing The Layer of Liquid Crystal Film Deposited on the Substrate Typically, the liquid crystal layer applied during Substep (A3) will require temperature treatment (i.e. "annealing") for a certain time period at a desired temperature in order that the liquid crystal film attains a good planar alignment texture. The annealing temperature can be chosen so that the texture of the liquid crystal film is highly planar and has a viscosity as low as possible. The annealing time can range from several minutes to hours, depending on the liquid crystal material used. Before polymerization, the liquid crystal film will typically exhibit narrow-band reflection characteristics with a bandpass from 50 nm to 80 nm in the visible region of the electromagnetic spectrum.

Substep (A5): Curing the Layer of Polymerizable Liquid Crystal Film Deposited on the Treated Substrate by way of Unidirectional UV Exposure When the polymerizable liquid crystal film has attained a perfect planar texture on the surface-treated substrate, it is then ready to be cured through polymerization (i.e. cross-linking) of the polymerizable CLC material component of the applied film. In the second embodiment of the CLC film fabrication process hereof, polymerization is achieved by exposing one surface thereof to UV light so that a non-linear intensity gradient is produced within the film. The UV intensity should be such chosen that a phase separation and molecular diffusion and redistribution of the non-cross-linkable compound is guaranteed before the completion of the polymerizable compound. After the polymerization seizes, a first sheet of broadband CLC polarizing film is obtained with "asymmetrical" polarization reflection characteristics over the whole visible range of the electromagnetic spectrum.

Substep (A6): Removing Substrate from the Cured Layer of Liquid Crystal Film

After the first sheet of liquid crystal film is cured, it is necessary to remove it from its substrate(s) and produce free standing broadband CLC film. Free-standing broadband CLC film can be obtained by: mechanically pealing the film off it support substrate; physical dissolving the substrate; chemical etching the substrate; or the like. These techniques are generally well known in the art and need not be described in further detail. After completion of this step, a first sheet of CLC film is provided having symmetrical polarization reflection characteristics.

Substep (A7): Repeating Substeps (A2) through (A6) to Produce a Second Sheet of Cured CLC Film Having Symmetrical Polarization Reflection Characteristics.

At this stage, Substeps (A2) through (A6) are repeated in order to produce a second sheet of cured CLC film having symmetrical polarization reflection characteristics similar to the first sheet thereof.

Substep (A8): Laminating First and Second CLC Film Layers having Asymmetrical Polarization Reflection Characteristics to Produce a Laminated Structure having Symmetrical Polarization Reflection Characteristics As discussed in the Background of Invention hereof, it has been discovered by applicants that, in general, the front (i.e. top) surface of polymerizable CLC film which is directly illuminated with a non-linear UV light intensity during the curing stage of the film fabrication process hereof will exhibit super "broadband" polarization characteristics, whereas the opposing back surface that is not directly illuminated thereby will exhibit different polarization reflection characteristics in terms of either in reflectivity or spectral bandwidth. As used hereinafter, cured CLC film having such polarization reflection characteristics shall be referred to as CLC film having "asymmetrical" reflection characteristics. Cured CLC film having asymmetrical characteristics is not ideal for use in making CLC coloring media of the present invention as there is a 50% chance that the top surface of any CLC microflake made from such material will be facing upwardly towards the surface of a CLC coating applied to a substrate that is illuminated by ambient white light during normal usage. Consequently, CLC coloring media made from "asymmetrical" CLC film is not as bright as would be ideally desired in most coloring applications because both the front and back surfaces of each CLC microflake thereof are "broadband surfaces" having different spectral characteristics.

In order to compensate for the shortcomings and drawbacks of such "asymmetrical" CLC film, the method of fabricating "symmetrical" broadband CLC film according to the present invention teaches at this stage of the process, bringing the back surface of the first sheet of cured CLC film into contact with the back surface of the second sheet of cured CLC film while the two sheets are being laminated together in using conventional lamination techniques. During lamination, it will be desired to use optically clear and isotropic adhesives having indices of refraction matched to the laminated sheets of asymmetrical CLC film. Preferably, such adhesives are non-birefringent and non-absorptive. Each surface of the resulting laminated CLC film structure will have either the same or substantially the same polarization reflection characteristics, thus will be ideal for use in the fabrication of the CLC pigments of the CLC coloring media of the present invention.

Specifying Color Characteristics of Symmetrical CLC Film by Controlling the Bandwidth and Spectral Position Thereof During the Film Fabrication Processes Described Above In Step (A) and Step (A') above, two different techniques have been disclosed in great detail for fabricating super broadband and broadband CLC film having "symmetrical" polarization reflection characteristics. Such techniques can be used to fabricate symmetrical broadband CLC film for "additive-primary" as well as "super-white" CLC coloring media of the present invention. When making super-white CLC coloring media of the present invention, it is necessary to ensure that the reflection bandwidth of the broadband circularly polarizing film material resides within the visible band of the electromagnetic spectrum (i.e. 350 to 750 nm). Similarly, when making additive-primary CLC coloring media of the present invention, imparting additive-primary color characteristics (e.g red, green, blue) to incident light reflected therefrom, it is necessary to ensure that the reflection characteristics of such CLC films reside within the respective (e.g. red, green or blue) portions of the visible spectrum.

In general, the bandwidth as well as the spectral position (i.e. "tuning") of the CLC film material of the present application can be controlled in a number of ways, for a variety of purposes during the film fabrication processes described above (e.g. for imparting color characteristics to the CLC pigments hereof, designing the filtering characteristics of the polarizers hereof, etc.). For example, the spectral and thus "color" characteristics of such CLC film can be controllably tuned by: selection of starting CLC polymer; controlling the intensity of UV light used to cure the CLC polymer film deposited on the substrate; controlling the direction of the UV light used during curing of the CLC polymer film; controlling the intensity gradient of the UV light used during curing; controlling the temperature gradient during curing of the CLC polymer film; and/or controlling the concentration of the nematic polymer, chiral polymer, photoinitiator, dye, etc. used in making the starting CLC polymer material; etc. The details of these different spectral-tuning techniques will be described below.

Controlling the Spectral Bandwidth of the Circularly Polarizing Film Material Hereof by Controlling the Thickness Thereof The first approach controls the spectral bandwidth of the circularly polarizing film material hereof by controlling the thickness thereof. For example, using the materials E31/CC4039L=1:2 by weight with 0.6% IG184, the polarizer bandwidth can be increased from 580 nm to 800 nm when the film thickness is changed from 5 to 20 microns. Thereafter, the polarizer films are cured under a UV intensity of 0.047 $mW/cm^2$ at 92° C.

Controlling The Spectral Bandwidth of the Circularly Polarizing Film Material Hereof by Changing the Concentration of the Chiral Additive The second approach controls the spectral bandwidth of the circularly polarizing film material hereof by changing the concentration of the chiral additive. For example, using the material E31/CC4039L=1:2 by weight with 0.6% IG184, with a film thickness of 20 microns, the polarizer film is cured under a UV intensity of 0.047 mW/cm2 at 70° C. When the S1011 chiral additive concentration is increased from 0 to 6.6% by weight, the bandwidth is decreased from 980 nm to 460 nm. In addition, with the increase in the chiral concentration, the center wavelength has a "blue" shift toward to shorter wavelength.

Controlling the Reflection/Polarizing Spectrum by Changing the Curing Temperature The third approach controls the spectral bandwidth of the circularly polarizing film material hereof by controlling the curing temperature. The following examples are given to further illustrate this method.

According to a first example, a liquid crystal mixture is prepared containing the components CC4039L: E44: I184= 4:0.69:.22:0.33:0.63. The intensity of the UV light using during curing is about 0.02 mW/cm2. During, the broadband CLC center wavelength changes from 610 to 700 then to 550 microns, and the bandwidth changes from 420 microns to 700 then 400 microns, respectively, when the temperature is varied from 60 to 90° C. then to 100° C.

According to another example, a liquid crystal mixture is prepared by mixing E31/CC4039L=1:2 by weight with 0.6% IG184. Film samples having a film thickness of 20 microns were cured under a UV light source having an intensity of 0.047 mW/cm2. When the curing temperature was lowered from 92° C. to 70° C., the center wavelength underwent a "red" shift toward a longer wavelength.

Controlling the Polarizing/Reflection Spectrum by Changing the Photoinitiator Concentration.

The fifth approach involves controlling the spectral bandwidth of the circularly polarizing film material hereof by changing the photoinitiator concentration. For example, liquid crystal mixture was formed by mixing materials E31/CC4039L=1:2 by weight, and forming a film having a thickness of 20 microns. The film samples were cured under a UV light source having an intensity of 0.047 mW/cm2, at a temperature of 92° C. In this case, increasing the photoinitiator (IG184) concentration from 1% to 2% decreases the bandwidth of the polarizing reflecting film from 1050 to 850 microns.

Controlling the Polarizing/Reflection Spectrum by Selection of Starting CLC Polymer Material The sixth approach involves controlling the spectral bandwidth of the circularly polarizing film material hereof by selection of the starting polymer materials in cholesteric order. Specifically, the starting CLC polymer is selected to have a particular short(er) pitch value so that the final BROADBAND CLC will have a "blue" shift in the polarizing wavelength. This technique can be illustrated by way of the following example.

Two CLC polysiloxanes (CC4039L and CC4070L) from Wacker are mixed with E7 nematic liquid crystal to produce two different liquid crystal mixtures. The mixtures are CC4039L (CC4070L)(E31LV=2:1 by weight with 0.6% 184 photoinitiator. The left handed polysiloxane CC4039L reflects at 390 nm while the CC4070L reflects at 700 nm, respectively. Film of 20 micron thickness is made from each of the mixtures and then cured at a temperature of 92° C. with a UV light source having the same light intensity of 0.047 mW/cm$^2$. The cured CLC film containing the shorter pitch polysiloxane CC4039L reflects in a shorter wavelength region from 370 nm to 1200 nm; while the cured CLC film containing the longer pitch polysiloxane CC4070L reflects in a longer wavelength region, from 560 to 2160 nm.

Controlling the Polarizing/reflection Spectrum by Changing the Intensity of the UV Curing Light The seventh approach involves controlling the spectral bandwidth of the circularly polarizing film material hereof by changing the intensity of the UV curing light source. To the extent that polymerization rate is linked to the intensity of incident UV radiation, when a nematic such as E7 is used with a CLC material such as CC4039L in a ratio of 1/2, the bandwidth of the resulting polarizer decreases as the UV intensity increases. At an intensity of 0.47 mW/cm$^2$, the resulting bandwidth is 980 nm. At an intensity of 0.97 mW/cm$^2$, the resulting bandwidth is 700 if cured at 92° C., and if cured at 92° C. at 7.1 mW/cm$^2$, the resulting bandwidth is 280 nm. These results clearly indicate that the bandwidth can be controlled by controlling the intensity of UV radiation during film curing.

Controlling the Polarizing/Reflection Spectrum by Changing the Direction of the UV Curing Light The eighth approach involves controlling the spectral bandwidth of the circularly polarizing film material hereof by changing the direction of the UV light source during curing. According to this mechanism, the UV gradient inside the film along the surface normal is selectively modified. By maintaining the total UV intensity inside a CLC film substantially constant, the single UV curing beam results in a wider reflection bandwidth than the double beam curing fashion.

Controlling the Polarizing/Reflection Spectrum by Changing the Concentration of Nematic Liquid Crystals The ninth approach involves controlling the spectral bandwidth of the circularly polarizing film material hereof by changing the concentration of the nematic liquid crystals in the raw starting mixture. This technique can be demonstrated as follows. For example, using a liquid crystal mixture consisting of E31 in CC4039L with a 0.6% IG184 photoinitiator with respect to the CC4039L compound, different mixtures are filled into 20 micron glass cells with rubbed polyimide coatings. All the samples are cured at 92° C. by a UV light source having an intensity of 0.047 mW/cm2. By changing the concentration of nematic liquid crystals (E31) in the raw starting mixture, the bandwidth of the resulting CLC films can be increased.

Controlling the Polarizing/Reflection Spectrum by Adding Different Types of Nematic Additives The tenth approach involves controlling the spectral bandwidth of the circularly polarizing film material hereof by adding different types of nematic additives. For example, it has been found that different types of nematic additives result in CLC film having a different bandwidth when added in the same concentration with polysiloxane. In particular, it has been found that additives E7, E31, E44, K15, K24, M15 widen the bandwidth. However, it has been found that nematic additives such as ZLI-2309, ZLI-5800-100 do not widen the bandwidth.

Controlling the Polarizing/Reflection Spectrum by Adding Different Types of Chiral Additives The eleventh approach involves controlling the spectral bandwidth of the circularly polarizing film material hereof by adding different types of chiral additives (having different "twisting power"). As an example of this technique, it has been found that given the same mixture containing CC4039R and E31, the addition of the same amount chirals (R1011, CE1, CB15) yields broadband CLC film having different spectral characteristics. As a further example, in a given CC4039R and E7 mixture, the chiral is separately mixed. For example, if the final pitch of each mixture before curing, i.e., CC4039R/E7/R1011, CC4039R/E7/CE1, and CC4039R/E7/CB15, is tuned to be the same. The final spectral characteristics thereof are different when the three CLC films are cured under the same conditions.

EXAMPLES OF CLC FILM FABRICATION

In the following examples of CLC film fabrication to be described in detail below, the polymerizable CLC, the nematic liquid crystal material, the photoinitiator (and in one example, a chiral additive) were weighed in a desired ratio and mixed together on a hot plate or equivalent device. In each example, the CLC mixture was introduced into a glass cell that had a buffed polyimide coating for better molecular alignment. Finally, the mixture was cured (e.g. polymerized) at a selected temperature by exposing the mixture to actinic light for a time sufficient to permit polymerization to go to completion. The actinic radiation (UV radiation) used to polymerize the CLC film material, exhibits a non-linear (e.g. exponential) intensity distribution within the CLC film or layer being cured, rather than the linear intensity distribution used during prior art fabrication processes. This is due to light attenuation caused by the materials used to make the CLC mixture layer. Apart from the above, the non-crosslinkable liquid crystal material may be in the liquid state in the finally formed polarizers after UV curing.

After mixing at a temperature which keeps the materials in a liquid state and before polymerization, the nematic liquid crystal material is weakly bound to the polymerizable CLC material. In response to actinic radiation exposure, polymerization causes the weakly bound liquid crystals to segregate from the polymerizable CLC and begin to diffuse. The nematic liquid crystal material diffuses to swollen regions of the polymerizable CLC forming liquid crystal-rich sites. The departure of liquid crystal from other regions of the polymerizable CLC leaves liquid crystal-depleted sites. Because the radiation intensity is non-linear (more specifically, exponential) in character throughout the medium and the higher intensity regions of polymerizable CLC are more swollen than lower intensity regions, the nematic liquid crystal material diffuses preferentially to sites of higher radiation intensity and assumes a non-linear distribution in the polymer CLC material. Advantageously, the super broadband polarizing film hereof can be made using commercially available materials provided that the segregation rate of the (nematic) liquid crystal material is greater than the polymerization rate of the CLC material being polymerized.

In Examples 1 through 10, the method of "symmetrical" CLC film fabrication described above (employing lamination subprocesses) has been used to produce the same. It is understood, however, that other methods can be used to produce the "symmetrical" reflective film of the present invention.

Example 1

In this example, a method is described for fabricating broadband CLC circularly polarizing film material for use in making the CLC-based microflakes of the present invention. The red compound of CLC polysiloxane (CC4070L) mentioned above is blended with E31 nematic liquid crystal, also mentioned above. The red CC4070L has a left-handed twist sense and reflects at 690 nm when cured at 70° C. The mixture contains E31/CC4070L in a ratio of ½ by weight with 0.6% 1G184 photoinitiator by weight. Photoinitiator IG184 is commercially available from Ciba Geigy, Hawthorne, N.Y. The mixture is introduced into a 20 micron glass cell and cured at an ultraviolet intensity of 0.047 mW/cm2 at a temperature, provided by a hot plate, of 92° C. In this example, only the CLC polysiloxane material is polymerized while the nematic liquid crystal remains in the liquid state. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light. The resulting polarizing film covered a spectral band pass from 560 nm to 2160 nm providing CLC-based polarizing reflecting film having a super-broad bandwidth of 1600 nm.

Example 2

In this example, a method is described for fabricating broadband CLC circularly polarizing film material for use in making the CLC-based microflakes of the present invention. In this example, the blue compound of CLC polysiloxane (CC 4039L) and nematic liquid crystal (E31) are mixed in a ratio of 2:1 by weight along with photoinitiator (IG184) of 0.6% by weight. A 20 micron glass cell is used to provide a film of that thickness. The CLC is cured by a UV lamp of 0.047 mW/cm2 at 92° C. The resulting polarizing layer covered a spectral band pass from 370 nm to 1,200 nm providing a super bandwidth polarizer of 830 nm, covering the whole visible and near IR spectral band. As with Example 1, the liquid crystal material (E31) remains in the liquid state after curing. After polymerization (i.e. curing), spectral analysis of the resulting circularly polarizing film material was carried out on a Perkin-Elmer, Lambda 19 spectrophotometer. Both transmission and reflection spectra were taken with the left-hand, right-hand and unpolarized light.

Example 3

In this example, a method is described for fabricating broadband CLC circularly polarizing film material for use in making the CLC-based microflakes of the present invention. The two previous examples utilized CLC polysiloxanes which had a left-handed twist sense. In this third example, a CLC polysiloxane having a right-handed helical (twist) sense is utilized. A blue compound (CC4070R) with such a twist sense is commercially available from Wacker, GmbH, Germany and reflects right-handed circular light at 390 nm when cured at 70° C. A nematic liquid crystal material (M15) commercially available from EM Industries, Germany, is mixed with the CLC polysiloxane material (CC 4039R) in a ratio of 1:2 by weight with 1% IG184 photoinitiator by weight. The mixture is sandwiches between the plates of a 20 micron glass cell and cured at a UV intensity of 0.047 mW/cm2 at 122° C. The resulting circularly polarizing film material reflective of right-hand circularly polarized light, covered a spectral band pass from 520 nm to 920 nm providing a super-broad bandwidth polarizer of 400 nm. After curing (i.e. polymerization), the nonpolymerizable liquid crystal (M-15) is in the solid state at room temperature. After polymerization, spectral analysis of the resulting samples was carried out on a Perkin-Elmer, Lambda 19 spectrophotometer. Both transmission and reflection spectra were taken with the left-hand, right-hand and unpolarized light.

Example 4

In this example, a method is described for fabricating broadband CLC circularly polarizing film material for use in making the CLC-based microflakes of the present invention. In this example, the material utilized contains non-polymerizable nematics plus chiral additive mixed with the polymerizable nematic liquid crystal. The non-polymerizable nematic materials are E31 and ZLI-2309. The chiral additive is S1011. All of these materials are commercially available from EM Industries, Germany. The chiral additive induces a left-handed spiral structure in the mixture. E31/ZLI-2309/S1011 are mixed together in a ratio of 1/1/0.2 by weight. This mixture is then mixed again with a polymerizable nematic liquid crystal polymer material CN 4000 in a ratio of 1:2 by weight. CN 4000 is commercially available from Wacker GmbH, Germany. The mixture along with a photoinitiator IG184 of 0.6% by weight is introduced into a cell formed from two pieces of rubbed polyimide coated glass substrates 20 microns apart and cured at a UV intensity of 0.047 mW/cm2 at a temperature of 70° C. Here this nematic liquid crystal material CN4000, polymerizes while the low molecular weight chiral nematic material remains in the liquid state. As with all other examples of the present invention, the segregation rate of the non-polarizable liquid crystal material is greater than the polymerization rate of the polymerizable liquid crystal material. The resulting circularly polarizing film material reflects left-handed circularly polarized radiation and covers a spectral band pass from 430 nm to 1050 nm providing CLC-Based polarizing reflecting film having a broad bandwidth of 620 nm. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light.

Example 5

In this example, a method is described for fabricating broadband CLC circularly polarizing film material for use in making the CLC-based microflakes of the present invention. In this example, the mixture consists of cross-linkable siloxane polymer in nematic order and chiral additive plus photoinitiator (IG184). Notably, no non-cross-linkable nematic liquid crystals (such as E31) are added. The siloxane nematic polymer (CN 4000) is from Wacker (German). The chiral additive consists of R1011, CB15, and CE1 (all from Merck, EMI). The mixture is CN4000/R1011/CB15/CE1/IG184=0.75:0.03:0.11:0.11:0.017, by weight. The mixture was then filled into a 20 micron glass cell with rubbed polyimide coating. After subjected to a UV exposure of around 0.2 mW/cm2 for a sufficient time at a temperature of 80° C., broadband reflective polarizing film was obtained which has a bandwidth from 360 to 750 nm. Since the chiral additive has a right-handed sense, this CLC polarizing film reflects right-handed circular polarization light. The importance of this example is that non-cross-linkable low molecular weight nematic liquid crystals are not necessarily needed to create broadband circularly polarizing film material, in accordance with the teachings of the present invention. A nematic liquid crystal polymer mixed simply with chiral additive will create a similar super-broadband polarizer. The same mechanism, i.e., polymerization induced molecular re-distribution (PIMRD), is still valid in this example. Since all the components of the chiral additive (i.e., R1011, CB15, CE1) are non-cross-linkable, the chiral molecules experience a phase separation and segregation from the nematic polymer network during polymerization. The segregated chiral molecules start to diffuse along the UV propagation direction, resulting in an accumulation and depletion of the chiral molecules in sites where the CLC pitch get shorter and longer, respectively. Finally, a pitch gradient is formed. Notably, the chiral additive is in a plural compound format. As evidenced by a separate experiment, two of the chiral compounds, i.e., CB15 and CE1, are phase separated from the liquid crystal polymer network and diffuse along the UV propagation direction during polymerization. However, the third chiral compound, R1011, does not show obvious evidence of phase separation and diffusion. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light.

Example 6

In this example, a method is described for fabricating the super-broadband CLC circularity polarizing material on a plastic substrate, which, possibly, has one surface free of substrate. The liquid crystal mixture used in this example can be any one mentioned throughout this application. The typical plastic substrate used is PET. The PET surface may or may not be necessarily treated with a rubbed polyimide coating. If no polyimide coating is required, the whole manufacture process becomes much simpler. The only treatment required of the PET substrate is mechanical rubbing its bare surface. The CLC mixture is applied onto one of the plastic substrate, then covered with a second PET sheet. Thereafter, the whole package is fed into a laminator at a suitable temperature. After lamination, a uniform CLC film is obtained between of the two pieces of plastic sheet material. The film is then subjected to a UV exposure with a suitable intensity for a sufficiently long time at a temperature of 80° C. A super-broadband CLC polarizer is obtained between plastic sheets. The optical property, including the extinction ratio, is similar to that between two glass substrates with rubbed polyimide. Finally, one of the plastic substrates can be pealed off so that one surface is free of substrate. The above-described method has the following advantages: (1) the overall polarizer thickness can be dramatically reduced to 0.25 mm due to the very thin plastic sheets; (2) the polarizer is mechanically flexible; (3) the manufacture procedure is simple; (4) larger size polarizer can be made; and (5) cost is substantially reduced. After polymerization, spectral analysis of the resulting circularly polarizing film material was carried out on a Perkin-Elmer, Lambda 19 spectrophotometer. Both transmission and reflection spectra were taken with the left-hand, right-hand and unpolarized light.

Example 7

In this example, broadband CLC circularly polarizing film material is made using a newly developed short pitch CLC liquid crystal polymer. This material (code name is CLM001CC, from Wacker, German) reflects left-handed circular polarization light at a selective reflection wavelength 309 nm. Once mixed with suitable amount of photoinitiator (such as IG184, Ciba Geigy), the CLC material can be UV polymerized. In order to make broadband polarizing film material, the short pitch polymerizable CLC material is mixed with a low molecular weight non-cross-linkable nematic material E7 (EMI). The material composition for broadband polarizer is CLM001CC/E7/IG184=0.157/0.065/0.0047 by weight. The mixture is filled into a 20 micron glass cell with a rubbed polyimide coating. After exposed to a suitable UV intensity for a sufficient time at 70° C., a broadband CLC polarizing reflecting film has been obtained which reflects almost 50% of an un-polarized light from 370 nm to 850 nm. Similar result has been obtained by mixing other non-cross-linkable nematic liquid crystals, such as M15 (Merck), E44, K15 and K24 etc. After polymerization, spectral analysis of the resulting samples was carried out on a Perkin-Elmer, Lambda 19 spectrophotometer. Both transmission and reflection spectra were taken with the left-hand, right-hand and unpolarized light.

Example 8

In this example, a method is described for fabricating free standing broadband CLC circularly polarizing film material. The material mixture contains CLM001CC/M15/IG184=2/1/0.06 by weight. The mixture was filled into a 20 micron glass cell with a rubbed polyimide. The sample was cured at 80° C. by a UV intensity of 0.011 mW/cm2. The resulted film reflects from 370 nm to 770 nm. After polymerization and while supported on the glass substrate, spectral analysis of the resulting circularly polarizing film material was carried out on a Perkin-Elmer, Lambda 19 spectrophotometer. Both transmission and reflection spectra were taken with the left-hand, right-hand and unpolarized light. Thereafter, one of the glass substrate was mechanically removed. Next, the broadband film was pealed away from the remaining glass substrate. A free standing broadband polarizing film has been obtained. The film spectra before and after pealing demonstrates that the optical property of the free standing broadband polarizing film has not been changed.

Example 9

In this example, the CLC material utilized is a left-handed polymerizable polysiloxane CLC (CC4039L) commercially available from Wacker, GbmH, Germany mixed with a non-polymerizable nematic E7 and a chiral additive R1011 both of which are commercially available from EM Industries, Germany. The polymerizable CLC material (CC4039L) has a left-handed twist structure while the chiral additive (R1011) has a right-handed twist structure. The materials E7/CC4039L/R1011/IG184 are present in a mixture in ratios of 1/2/0.1/0.012 by weight. IG184 is a photoinitiator. The mixture was introduced into a 20 micron thick glass cell with a rubbed polyimide coating and was cured at a UV intensity of 0.047 mW/cm2 at 82° C. In this example, the cholesteric liquid crystal material (CC4039L) polymerizes while the nematic (E7) remains in the liquid state after curing. As with the other examples, the segregation rate of the non-polymerizable liquid crystal is greater than the polymerization rate of the polysiloxane. After polymerization, spectral analysis of the resulting samples was carried out on a Perkin-Elmer, Lambda 19 spectrophotometer. Both transmission and reflection spectra were taken with the left-hand, right-hand and unpolarized light. The resulting CLC circularly polarizing film reflects left-handed circularly polarized radiation and covers a spectral band pass from 800 nm to 1428 nm, providing a super-broad bandwidth polarizing film of over 600 nm in the near infrared (IR) region of the electromagnetic spectrum. In this example, the chiral additive is utilized to control the band position and different concentrations will control the band passes available.

Example 10

In this example, a broadband CLC polarizing film is fabricated based on an acrylate liquid crystal compound in cholesteric order mixed with non-crosslinkable nematic liquid crystals. Two polymerizable acrylate cholesteric liquid crystal compounds, CM 95 and CM 94 (BASF, Aktiengesellschaft, Ludwigshafen, German), reflecting right-handed circular polarization at blue and red wavelength, respectively, are used in this example. The blue compound, CM95, is mixed with a non-cross-linkable nematic M15 (EMI) and photo initiator IG184 (Cyba Geigy) at a ratio of CM:M15:IG184=2:1:0.06 by weight. The mixture is filled into a 20 micron glass cell with rubbed polyimide coating and cured at 35° C. with a suitable UV irradiation for a sufficiently long time. The resulted broadband polarizing film reflects right-handed light from 590 nm to 900 nm, with a bandwidth about 310 nm. Other nematic materials such as E7, etc., also can broaden the polarizing bandwidth when mixed with the acrylate CLC and exposed to UV light.

Alternatives to Polymerizable CLC and Liquid Crystal Materials

Most of the above described examples demonstrate that commercially available polymerizable CLC and liquid crystal materials may be utilized to fabricate super-broadband polarizing film structures hereof. However, it should be appreciated that the fabrication techniques of the present invention can also be used with any cyclic liquid crystal siloxane, wherein the mesogenic group is attached to a siloxane backbone by hydrosilylation, as well as with any other liquid crystal polymers, such as acrylate, etc.

Similarly, while the nematic liquid crystal material utilized in the above examples are all commercially available, it should also be appreciated that any low molecular weight, non-polymerizable nematic liquid crystal material may be utilized in the practice of the present invention. Also, as shown in Example 4, polymerizable nematics may be used so long as their relative diffusion rate is greater than their polymerization rate.

The nematics utilized may be single compound liquid crystals like K15, K24 and M15 which are commercially available from EM Industries, Germany. Multiple compound mixtures of liquid crystal materials like E31, E44, and E7 commercially available from EM Industries, Germany, and ZLI-2309 and ZLI-5800-100 commercially available from EM Industries, Germany, may also be utilized in the practice of the present invention. All of these liquid crystals are in nematic phase at room temperature except K24 which is in the smectic phase at room temperature. These liquid crystals, when combined with a polymerizable CLC material and a photoinitiator produce polarizers of super-broad bandwidth of at least 700 nm. Finally, at low concentrations of liquid crystal material in the polymerizable CLC material, smaller than a ratio of 1/6 by weight, the resulting bandwidth falls off sharply indicating that low concentrations of nematic material are one of the limiting factors. Also, it should be appreciated that high concentrations of nematic to CLC, like a ratio of 2/3, results in a high reflection if the mixture is polymerized at a suitably lower temperature; otherwise light scattering is induced if the mixture is cured at a non-suitably high temperature.

In the above examples, specific UV curing intensities were prescribed to provide the broadband and super broadband polarizers of the present invention. To the extent that the polymerization rate is linked to the intensity of incident UV radiation during curing, when a nematic like E7 is used with a CLC material like CC4039L in a ratio of 1/2, the bandwidth of the resulting polarizer changes as the UV intensity increases. At an intensity of 0.047 mW/cm2, for example, the resulting bandwidth is 980 nm. At an intensity of 0.97 mW/cm2, the resulting bandwidth is 700 nm if cured at 92° C. and, if cured at 92° C. at 7.1 mW/cm2, the resulting bandwidth is 280 nm. This clearly indicates that bandwidth can be controlled by controlling the intensity of UV radiation.

While the preferred embodiments have been characterized as having an exponential distribution of CLC helical pitches, it should be appreciated that departures from an exact exponentially distribution can be tolerated without departing from the spirit of the present invention. Thus, impurities in the materials, radiant energy variations and polymerization variations may cause a departure from an ideal exponential function providing liquid crystal distributions across the thickness of the resulting polarizers which can only be described as being non-linear in character. Departures from the ideal exponential function do not appear to affect the enhancements in bandwidths obtained when the distribution is exponential.

Step B: Fracturing the Symmetrical CLC Film into CLC Microflakes (i.e. Microscopic Pigments) while Controlling the Size Thereof The second Step of the microflake fabrication process (i.e. "Step B") involves fragmenting the CLC film into CLC microflakes or CLC platelets of microscopic dimensions. Notably, each broadband CLC microflake has its liquid crystals cholesterically ordered about a helical axis that is prealigned normal to the surface of the broadband CLC microflake. The symmetrical CLC film hereof can be fractured either while mounted on its substrate or in a free-standing form (removed from its substrate). Several techniques for fracturing such CLC film into CLC microflakes will be described below.

Fracturing CLC Film on its Substrate.

Using this techniques, CLC film hereof mechanically fractured into such micro-sized flakes while supported on its substrate. Any of the techniques described in applicant's U.S. Pat. No. 5,364,557, incorporated herein by reference, can be used to fracture the substrate supported CLC film. Typically, both the CLC film and the substrate upon the CLC film is supported are fractured. After carrying out the fracturing operations, the fractured pigments and substrate material must be carefully removed from the substrate using either substrate dissolving or chemical etching methods. In general, this can be done in one of a number of possible ways. For example, if the substrate material can be physically dissolved in certain types of solutions, such as salt in water, PVA in water, etc., without disolving the CLC film, then the fractured pigments are placed into the solution until the substrate material is totally dissolved. Thereafter, a new solution is used to rinse CLC microflakes until the substrate composition is totally gone. Finally, the CLC microflakes are dried and ready for combination with a suitable optically transparent carrier medium.

Alternatively, if the substrates (e.g. glass) are etchable using certain types of solvents, such as glass in hyroflouric (HF) acid, then the fractured CLC microflakes are placed in the solvent until the substrates are totally etched away. Thereafter, the CLC microflakes are rinsed with clean solvent to remove residual substrate from the CLC microflakes. Finally, the CLC microflakes are dried in order to prepare them for use in the fabrication process hereof.

Other methods may be used to remove the substrate from CLC microflakes. For example, broadband CLC films made on glass, salt, or other substances which are fragile upon mechanical shock, can be fractured by placing the CLC film and its substrate in a powerful ultrasonic bath. Alternatively, if the CLC film of the present invention is not brittle, it is still possible to use it for producing CLC microflakes by patterning and etching techniques well known in the art. In this case, photo-resist or etch resist patterns are generated which serve to project the desired microflake regions, and the exposed regions are etched away by a suitable wet or dry etching techniques. This would produce CLC microflakes of the desired size and shape.

Fracturing CLC Film without Substrates (Free-standing Film).

CLC film of the present invention can be fractured into microflakes (or platelets) while in its free-standing configuration (removed from its substrate). In this situation, any of the techniques described in applicant's U.S. Pat. No. 5,364,557 can be used, including mechanical grinding, ultrasonic fracturing, and photolitographic and/or chemical etching techniques.

Controlling the Size of CLC Microflakes

In order to make super-broadband CLC microflakes for use in making "super-white" coloring media of the present invention, the thickness of the CLC microflakes should range from about 20 to about 25 microns. The lateral dimensions of the microflakes should be at least three times larger than the thickness dimension, i.e., at least 60 to 75 microns. The upper limit on the lateral size of the CLC microflakes for use in making super-white coloring media should be no larger than 100 microns.

Illustrative Examples of CLC Microflake Construction According To The Present Invention A number of different examples have been set forth above on how to make CLC film material having LHCP and RHCP reflection characteristics over a super broad-band, broadband or spectrally-tuned region of the electromagnetic spectrum. Using such CLC film, CLC microflakes can be made using the various fragmentation techniques described above. Notably, however, CLC microflakes of the present invention can be constructed in a variety of different ways in order to impart "symmetrical" polarization-selective reflection characteristics. Various illustrative embodiments for the spectrally-tuned microflake construction of the present invention are set forth in FIGS. 2B, 2C, 2D1, and 2D2. The various illustrative embodiments for the broadband (or super broadband) microflake construction of the present invention are set forth in FIGS. 3B, 3C, 3D1, and 3D2. The details of microflake construction, along with their respective pitch distributions and spectral reflection characteristics, will be described below.

First Illustrative Embodiment of Spectrally-Tuned CLC Microflake Construction

Figure 2A:
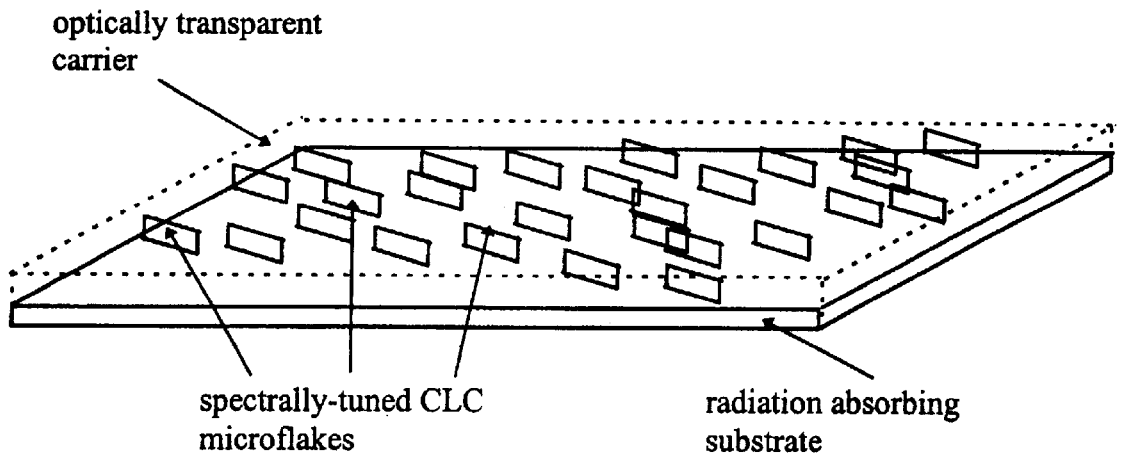
FIG. 2A is a schematic representation of a thin "quasi-specular reflective" coating of "additive-primary" coloring media of the present invention comprising spectrally-tuned CLC microflakes suspended within an optically transparent carrier medium applied to the surface of a radiation absorbing substrate.

In FIG. 2B, a first illustrative embodiment of the spectrally-tuned (narrowband) CLC microflakes of the present invention is schematically depicted. This microflake construction can be used to manufacture additive-primary coloring media of the present invention having either specularly reflective or non-specularly reflective characterisics, as shown in FIGS. 1 and 2A, respectively. As shown, this microflake has double-layer laminated construction, in which each layer thereof is made from the same LHCP or RHCP CLC film material and each surface thereof has substantially the same circularly polarizing reflection characteristics over the visible band portion of the electromagnetic spectrum. In FIG. 2B1(A), the pitch distribution of CLC molecules along the thickness dimension of an exemplary CLC microflake is shown for an exemplary embodiment of the double-laminated microflake construction of FIG. 2B. In FIG. 2B2, the spectral reflection characteristics of the first (i.e. upper) and second (i.e. lower) surfaces of the spectrally-tuned LHCP (or RHCP) CLC film layers are graphically illustrated. As shown, the reflection characteristics of these CLC film layers produce an additive-primary color effect (e.g. red) in the human vision system. In FIG. 2B2, a graphical comparison of the spectral reflection characteristics of the first and second surfaces of the spectrally-tuned LHCP (or RHCP) CLC film layers is shown. As indicated in this graphical plot, there is significant asymmetry in the spectral reflection characteristics. To construct the CLC microflake of FIG. 2B, the surfaces of a pair of CLC film layers having the same spectral reflection characteristics are brought together and laminated to form a laminated film structure having symmetrical reflection characteristics. Thereafter, the laminated CLC film structure can be fragmented to form microflakes as described hereinabove.

Second Illustrative Embodiment of Spectrally-Tuned CLC Microflake Construction

In FIG. 2C, a second illustrative embodiment of the spectrally-tuned CLC microflake of the present invention is schematically depicted. This microflake construction can be used to manufacture additive-primary coloring media of the present invention having either specularly reflective or non-specularly reflective characterisics, as shown in FIGS. 1 or 2A. As shown, this microflake has double-layer laminated construction, in which the first layer thereof is made from spectrally-tuned (narrowband) RHCP CLC film material and the second layer thereof is made from spectrally-tuned LHCP CLC film, and each surface thereof has substantially the same circularly polarizing reflection characteristics over the spectrally-tuned portion of the electromagnetic spectrum. In FIG. 2C1(A), the pitch distribution of CLC molecules along the thickness dimension of an exemplary CLC microflake is shown for a first embodiment of the double-laminated microflake construction of FIG. 2C. In FIG. 2C2, the spectral reflection characteristics of the first (i.e. upper) and second (i.e. lower) surfaces of the spectrally-tuned LHCP and RHCP CLC film layers are graphically illustrated. As shown, the reflection characteristics of these CLC film layers produce an additive-primary color effect (e.g. red) in the human vision system. In FIG. 2C2, a graphical comparison of the spectral reflection characteristics of the spectrally-tuned LHCP and RHCP CLC film layers is shown. As indicated in this graphical plot, there is significant asymmetry in the spectral reflection characteristics of these component layers. To construct the CLC microflake of FIG. 2C, the surfaces of a pair of RHCP and LHCP CLC film layers having substantially the same spectral reflection characteristics are brought together and laminated to form a laminated film structure having symmetrical reflection characteristics. Thereafter, the laminated CLC film structure can be fragmented to form spectrally-tuned CLC microflakes as described hereinabove.

Third Illustrative Embodiment of Spectrally-Tuned CLC Microflake Construction

In FIG. 2D1, a third illustrative embodiment of the spectrally-tuned CLC microflake of the present invention is schematically depicted. This microflake construction can be used to manufacture additive-primary coloring media of the present invention having either specularly reflective or non-specularly reflective characterisics, as shown in FIGS. 1 or 2A. The primary advantage of this construction is that both LHCP and RHCP components of incident light are totally reflected, thus resulting in significantly brighter color effects and/or images. There is, however, one minor limitation associated with this microflake construction in that it cannot be used for 3-D stereoscopic imaging applications as both LHCP and RHCP components of incident light are reflected.

As shown in FIG. 2D1, this microflake has double-layer laminated construction, wherein the first CLC layer is made from a first layer of LHCP CLC film material having a first phase retardation surface formed therein, and the second CLC layer is made from a second layer of LHCP CLC film material having a second phase retardation surface formed therein adjacent the first phase retardation surface. The first and second layers have substantially the same circularly polarizing reflection characteristics over the spectrally-tuned band portion of the electromagnetic spectrum in which the microflake has been designed to operate. In general, the first and second phase retardation surfaces each impart phase retardation to incident electromagentic radiation such that each wavelength in the spectrally-tuned band, passing through the first and second phase retardation surfaces, undergoes π radians phase retardation. Consequently, when LHCP light falls incident the RHCP layer of the microflake and passes the first and second phase retardation surfaces thereof, it will converted into RHCP polarized and thus reflect off the LHCP layer of the microflake after passing through the phase retardation surfaces. Similarly, when RHCP light falls incident the microflake surface and passes the first and second phase retardation surfaces thereof, it will become LHCP polarized, and thus reflect off the LHCP layer of the microflake after passing through the phase retardation surfaces. By virtue of this reflective mechanism, this microflake construction reflects 100% of all incident light within the spectrally-tuned band of the microflake. In general, there are a number of ways in which to realize the necessary π phase retardation amount at each wavelength over the spectrally-tuned band. For example, the first and second phase retardation surfaces can be designed to each impart π/2 radians phase retardation at each wavelength over the spectrally-tuned band of the microflake. In some instances, however, this implementation may be difficult to carry out in practice. In an alternative realization, which should be easier to practice, the first phase retardation surface could be designed to impart π radians over a first portion of the spectrally-tuned band of the microflake, whereas the second phase retardation surface could be designed to impart π radians over the second portion of the spectrally-tuned band of the microflake. In either such embodiment, it is preferred that each phase retardation surface is realized by molecularly reorientating the liquid crystal molecules in the CLC film layer as taught in applicant's copending application Ser. No. 08/743,293 entitled "Liquid Crystal Film Structures With Phase-Retardation Surface Regions Formed Therein And Methods Of Fabricating The Same" by Sadeg Faris filed Nov. 4, 1996, incorporated herein by reference. Using the phase retardation formation techniques taught in this copending application, the pitch of the CLC molecules over each such phase retardation region $\phi_1$ and $\phi_2$ approaches infinity, as graphically illustrated in FIG. 2D3, while the pitch of the CLC molecules over the LHCP CLC film layers is substantially constant. To construct the CLC microflake of FIG. 2D1, the surfaces of a pair LHCP CLC film layers having substantially the same spectral reflection characteristics are first processed to form phase retardation regions $\phi_1$ and $\phi_2$ respectively, and thereafter are brought together and laminated as shown in FIG. 2D1 to form a laminated film structure having symmetrical reflection characteristics on its outer surfaces. Thereafter, the laminated CLC film structure can be fragmented to form spectrally-tuned CLC microflakes as described hereinabove.

Fourth Illustrative Embodiment of Spectrally-Tuned CLC Microflake Construction

In FIG. 2D2, a fourth illustrative embodiment of the spectrally-tuned CLC microflake of the present invention is schematically depicted. This microflake construction can be used to manufacture additive-primary coloring media of the present invention having either specularly reflective or non-specularly reflective characterisics, as shown in FIGS. 1 or 2A. As shown, this microflake has a double-layer laminated construction, wherein the first CLC layer is made from a first layer of RHCP CLC film material having a first phase retardation surface formed therein, and the second CLC layer is made from a second layer of RHCP CLC film material having a second phase retardation surface formed therein adjacent the first phase retardation surface. The first and second layers have substantially the same circularly polarizing reflection characteristics over the spectrally-tuned band of the electromagnetic spectrum. In general, the first and second phase retardation surfaces each impart phase retardation to incident electromagentic radiation such that each wavelength in the spectrally-tuned band, passing through the first and second phase retardation surfaces, undergoes π radians phase retardation. Consequently, when LHCP light falls incident the RHCP layer of the microflake and passes the first and second phase retardation surfaces thereof, it is converted into RHCP polarized and thus reflect off the LHCP layer of the microflake after passing through the phase retardation surfaces thereof. Similarly, when RHCP light falls incident the microflake surface and passes the first and second phase retardation surfaces thereof, it is converted into LHCP light, and thus reflect off the LHCP layer of the microflake after passing through the phase retardation surfaces thereof. By virtue of this reflective mechanism, this microflake construction reflects 100% of all incident light within the spectrally-tuned band of the microflake. In general, there are a number of ways in which to realize the necessary π phase retardation amount at each wavelength over the spectrally-tuned band of the microflake. For example, the first and second phase retardation surfaces can be designed to each impart π/2 radians phase retardation at each wavelength over the spectrally-tuned band of the microflake. In some instances, however, this implementation may be difficult to carry out in practice. In an alternative realization, which should be easier to practice, the first phase retardation surface could be designed to impart π radians over a first portion of the spectrally-tuned band, whereas the second phase retardation surface could be designed to impart π radians over the second portion of the spectrally-tuned band. In either such embodiment, the phase retardation surface is realized by molecularly reorientating the liquid crystal molecules in the CLC film layer as taught in applicant's copending application Ser. No. 08/743,293, supra. Using the phase retardation formation techniques taught in this copending application, the pitch of the CLC molecules over each such phase retardation region $\phi_1$ and $\phi_2$ approaches infinity, as graphically illustrated in FIG. 2D4, while the pitch of the CLC molecules over the LHCP CLC film layers is constant. In FIG. 2D5, the spectral reflection characteristics of the first (i.e. upper) and second (i.e. lower) surfaces of the spectrally-tuned RHCP CLC film layer are graphically illustrated. As shown, the reflection characteristics of these CLC film layers produce an additive-primary (e.g. red) color effect in the human vision system. In FIG. 2D5, a graphical comparison of the spectral reflection characteristics of the spectrally-tuned LHCP and RHCP CLC film layers is shown. As indicated in this graphical plot, there is significant asymmetry in the spectral reflection characteristics of these component layers. To construct the CLC microflake of FIG. 2D2, the surfaces of a pair RHCP CLC film layers having substantially the same spectral reflection characteristics are first processed to form the first and second phase retardation regions $\phi_1$ and $\phi_2$ respectively, and thereafter are brought together and laminated as shown in FIG. 2D2 to form a laminated film structure having symmetrical reflection characteristics on its outer surfaces. Thereafter, the laminated CLC film structure can be fragmented to form spectrally-tuned CLC microflakes as described hereinabove.

First Illustrative Embodiment of Broadband CLC Microflake Construction

In FIG. 3B, a first illustrative embodiment of the broadband CLC microflake of the present invention is schematically depicted. This microflake construction can be used to manufacture super-white and mirror-like coloring media of the present invention, as shown in FIGS. 3A1 or 3A2, respectively. As shown, this microflake has double-layer laminated construction, in which each layer thereof is made from the same superbroad band (or broadband) LHCP or RHCP CLC film material and each surface thereof has substantially the same circularly polarizing reflection characteristics over the visible band portion of the electromagnetic spectrum. Depending on how the component film layers are laminated together, different pitch distribution characteristics may arise. For example, in FIG. 3B1(A), the pitch distribution of CLC molecules along the thickness dimension of an exemplary CLC microflake is shown for a first embodiment of the double-laminated microflake construction of FIG. 3B. In FIG. 3B1(B), the pitch distribution of CLC molecules along the thickness dimension of an exemplary CLC microflake is shown for a second embodiment of the double-laminated microflake construction of FIG. 3B. In FIG. 3B2, the spectral reflection characteristics of the first (i.e. upper) and second (i.e. lower) surfaces of the broadband LHCP (or RHCP) CLC film layers are graphically illustrated. In FIG. 3B2, a graphical comparison of the spectral reflection characteristics of the first and second surface of the broadband LHCP (or RHCP) CLC film layers is shown. As indicated in this graphical plot, there is significant asymmetry in the spectral reflection characteristics. To construct the broadband CLC microflake of FIG. 3B, the surfaces of a pair of CLC film layers having the same spectral reflection characteristics are brought together and laminated to form a laminated film structure having symmetrical reflection characteristics. Thereafter, the laminated CLC film structure can be fragmented to form broadband CLC microflakes as described hereinabove.

Second Illustrative Embodiment of Broad-Band CLC Microflake Construction

In FIG. 3C, a second illustrative embodiment of the broadband CLC microflake of the present invention is schematically depicted. This microflake construction can be used to manufacture super-white or mirror-like coloring media of the present invention, as shown in FIGS. 3A1 or 3A2, respectively. As shown, this microflake has double-layer laminated construction, in which the first layer thereof is made from superbroad band (or broadband) RHCP CLC film material and the second layer thereof is made from superbroad band (or broadband) LHCP CLC film. Each surface thereof has substantially the same circularly polarizing reflection characteristics over the visible band portion of the electromagnetic spectrum. Depending on how the component film layers are laminated together, different pitch distribution characteristics may arise. For example, in FIG. 3C1(A), the pitch distribution of CLC molecules along the thickness dimension of an exemplary CLC microflake is shown for a first embodiment of the double-laminated microflake construction of FIG. 3C. In FIG. 3C1(B), the pitch distribution of CLC molecules along the thickness dimension of an exemplary CLC microflake is shown for a second embodiment of the double-laminated microflake construction of FIG. 3C. In FIG. 3C2, the spectral reflection characteristics of the first (i.e. upper) and second (i.e. lower) surfaces of the broadband RHCP CLC film layer are graphically illustrated. In FIG. 3C2, a graphical comparison of the spectral reflection characteristics of the broadband LHCP and RHCP CLC film layers is shown. As indicated in this graphical plot, there is significant asymmetry in the spectral reflection characteristics of these component layers. To construct the CLC microflake of FIG. 3C, the surfaces of a pair of RHCP and LHCP CLC film layers having substantially the same spectral reflection characteristics are brought together and laminated to form a laminated film structure having substantially symmetrical reflection characteristics. Thereafter, the laminated CLC film structure can be fragmented to form microflakes as described hereinabove.

Third Illustrative Embodiment of Broadband CLC Microflake Construction

In FIG. 3D1, a third illustrative embodiment of the broadband CLC microflake of the present invention is schematically depicted. This microflake construction can be used to manufacture super-white or mirror-like coloring media of the present invention, as shown in FIGS. 3A1 or 3A2, respectively. The primary advantage of this construction is that both LHCP and RHCP components of incident light are totally reflected, thus resulting in significantly brighter color effects and/or images. There is, however, one minor limitation associated with this microflake construction in that it cannot be used for 3-D stereoscopic imaging applications as both LHCP and RHCP components of incident light are reflected.

As shown in FIG. 3D1, this microflake has double-layer laminated construction, wherein the first CLC layer is made from a first layer of superbroad band (or broadband) LHCP CLC film material having a first phase retardation surface formed therein, the second superbroad band (or broadband) CLC layer is made from a second layer of LHCP CLC film material having a second phase retardation surface formed therein adjacent the first phase retardation surface. In general, the first and second phase retardation surfaces each impart phase retardation to incident electromagentic radiation such that each wavelength in the visible band, passing through the first and second phase retardation surfaces, undergoes a $\pi$ radians phase retardation. Consequently, when LHCP light falls incident the RHCP layer of the microflake and passes the first and second phase retardation surfaces thereof, it is converted into RHCP polarized light and thus reflects off the LHCP layer of the microflake after passing through the phase retardation surfaces thereof. Similarly, when RHCP light falls incident the microflake surface and passes the first and second phase retardation surfaces thereof, it is converted into LHCP light, and thus reflects off the LHCP layer of the microflake after passing through the phase retardation surfaces thereof. By virtue of this reflective mechanism, this microflake construction reflects 100% of all incident light within the visible band. In general, there are a number of ways in which to realize the necessary $\pi$ phase retardation amount at each wavelength over the visible band. For example, the first and second phase retardation surfaces can be designed to each impart $\pi/2$ radians phase retardation at each wavelength over the visible band. In some instances, however, this implementation may be difficult to carry out in practice. In an alternative realization, which should be easier to practice, the first phase retardation surface could be designed to impart a $\pi$ radians over a first portion of the visible band, whereas the second phase retardation surface could be designed to impart a $\pi$ radians over the second portion of the visible band. Preferably, each phase retardation surface is realized by molecularly reorientating the liquid crystal molecules in the CLC film layer as taught in Applicant's copending application Ser. No. 08/743,293, supra. Using the phase retardation formation techniques taught in this copending Application, the pitch of the CLC molecules over each such first and second phase retardation region $\phi_1$ and $\phi_2$ approaches infinity, as graphically illustrated in FIG. 3D3, while the pitch of the CLC molecules over the LHCP CLC film layers is non-linear (i.e. exponential) in accordance with the teachings set forth in applicant's copending application Ser. No. 08/739,467, supra.

To construct the CLC microflake of FIG. 3D1, the surfaces of a pair LHCP CLC film layers having substantially the same spectral reflection characteristics are first processed to form phase retardation surfaces $\phi_1$ and $\phi_2$ in the manner described above, and thereafter are brought together and laminated as shown in FIG. 3D1 to form a laminated film structure having symmetrical reflection characteristics on its outer surfaces. Thereafter, the laminated CLC film structure can be fragmented to form broadband CLC microflakes as described hereinabove.

Fourth Illustrative Embodiment of the Broadband CLC Microflake Construction of the Present Invention In FIG. 3D2, a fourth illustrative embodiment of the broadband CLC microflake of the present invention is schematically depicted. This microflake construction can be used to manufacture super-white or mirror-like coloring media of the present invention, as shown in FIGS. 3A1 or 3A2, respectively. As shown, this microflake has a double-layer laminated construction, wherein the first CLC layer is made from a first layer of superbroad band (or broadband) RHCP CLC film material having a first phase retardation surface formed therein, and the second CLC layer is made from a second layer of superbroad band (or broadband) RHCP CLC film material having a second phase retardation surface formed therein adjacent the first phase retardation surface. The first and second layers have substantially the same circularly polarizing reflection characteristics over the visible band portion of the electromagnetic spectrum. In general, the first and second phase retardation surfaces of this particular microflake construction each impart phase retardation to incident electromagentic radiation such that each wavelength in the visible band, passing through the first and second phase retardation surfaces, undergoes a $\pi$ radians phase retardation. Consequently, when LHCP light falls incident the RHCP layer of the microflake and passes the first and second phase retardation surfaces thereof, it is converted into RHCP polarized light and thus reflects off the LHCP layer of the microflake after passing through the phase retardation surfaces thereof. Similarly, when RHCP light falls incident the microflake surface and passes the first and second phase retardation surfaces thereof, it is converted into LHCP light, and thus reflects off the LHCP layer of the microflake after passing through the phase retardation surfaces thereof. By virtue of this reflective mechanism, this microflake construction reflects 100% of all incident light within the visible band. In general, there are a number of ways in which to realize the necessary $\pi$ phase retardation amount at each wavelength over the visible band. For example, the first and second phase retardation surfaces can be designed to each impart $\pi/2$ radians phase retardation at each wavelength over the visible band. In some instances, however, this implementation may be difficult to carry out in practice. In an alternative realization, which should be easier to practice, the first phase retardation surface could be designed to impart $\pi$ radians over a first portion of the visible band, whereas the second phase retardation surface could be designed to impart $\pi$ radians over the second portion of the visible band. In the preferred embodiment thereof, each phase retardation surface is realized by molecularly reorientating the liquid crystal molecules in the CLC film layer as taught in applicant's copending application Ser. No. 08/743,293, supra. Using the phase retardation formation techniques taught in this copending application, the pitch of the CLC molecules over each such phase retardation region $\phi_l$ and $\phi_2$ approaches infinity, as graphically illustrated in FIG. 3D4, while the pitch of the CLC molecules over the RHCP CLC film layers is non-linear (i.e. exponential) in accordance with the teachings set forth in applicant's copending application Ser. No. 08/739,467, supra.

In FIG. 3D5, the spectral reflection characteristics of the first (i.e. upper) and second (i.e. lower) surfaces of the superbroad band RHCP CLC film layer are graphically illustrated. In FIG. 3D5, a graphical comparison of the spectral reflection characteristics of these superbroad band CLC film layers is shown. As indicated in this graphical plot, there is significant asymmetry in the spectral reflection characteristics of these component layers. To construct the CLC microflake of FIG. 3D2, the surfaces of a pair RHCP CLC film layers having substantially the same spectral reflection characteristics are first processed to form phase retardation surfaces $\phi_1$ and $\phi_2$ respectively, and thereafter are brought together and laminated as shown in FIG. 3D2 to form a laminated film structure having symmetrical reflection characteristics on its outer surfaces, in accordance with the principles of the present invention. Thereafter, the laminated CLC film structure can be fragmented to form broadband CLC microflakes as described hereinabove.

Step C: Selecting an Optically Transparent Carrier (or Host) Medium for the CLC Microflakes The third step (i.e. "Step C") of the CLC coloring media fabrication process involves selecting a light transmissive carrier medium for carrying the CLC microflakes. In general, the carrier medium selection process should consider the index of refraction, solubility, viscosity, adhesion-to-surface, resistance-to-temperature, humidity, mechanical torture, etc., of the carrier medium. Preferrably, the properties of the carrier medium should be selected to carefully match the average size, thickness and optical properties (e.g. index of refraction) of the CLC microflakes.

In particular, the carrier medium should be optically transparent (i.e. clear) when cured. The carrier medium should have an index of refraction close to the index of refraction of the CLC microflakes hereof. The carrier medium should not ruin (e.g. dissolve) the CLC microflakes, and should be resistant to humidity, and withstand relatively high temperature environments, e,g, 90° C. Preferrably, the carrier medium should be flexible when cured or dried. However, if the CLC coloring media is printed/painted onto a hard substrate surface, then a non-flexible carrier can be used. The carrier should be cureable by way of thermal curing, photon curing, or air-drying by evaporation. After drying, the CLC microflakes should remain permanently inside the carrier and stable in terms of their optical properties.

In order that the additive-primary coloring media of the present invention provides a superbright color appearance in the eyes of the viewer independent of viewing angle, the spectrally-tuned CLC microflakes, illustrated in FIGS. 2B through 2D5, must be randomly oriented within the coating or layer of applied carrier medium, as schematically illustrated in FIG. 1. This way, incident light having a spectral range from 400 nm to 750 nm in visible band, is reflected in a diffusive (i.e. non-specular) manner within the additive-primary color band. To ensure that the CLC microflakes assume a substantially random or quasi-random orientation within a coating of carrier medium, the mean thickness of the film coating should be at least 60 microns (or the largest linear dimension of the CLC microflakes) to ensure a large viewing angle, i.e., close to 90° from surface normal. As will be explained in greater detail hereinafter in Step D below, such carrier thicknesses can be acheived by engineering the viscosity of the carrier medium so that spectrally-tuned CLC microflakes within an applied layer (or coating) of the super-white coloring media are allowed to automatically assume a substantially random or quasi-random orientation within the applied layer. In order to facilatate this quasi-random orientation of the CLC flakes, a suitably thick (e.g. 60 microns) coating of the CLC ink or paint should be applied to the substrate during drying. With the CLC microflake size being about 60 microns or less, and the thickness of the microflakes about 20 microns or less, a 60 microns thick coating allows a portion of the microflakes to assume a substantially random or quasi-random orientation during application onto the substrate, while other microflakes stack up in any overlying relationship, relative to the substrate within the carrier medium.

In order that the additive-primary coloring media of the present invention provides a super bright color appearance in the eyes of the viewer "dependent" on viewing angle, the spectrally-tuned CLC microflakes should be uniformly oriented within the coating or layer of applied carrier medium, as schematically illustrated in FIG. 2A. This way, incident light having a spectral range from 400 nm to 750 nm in visible band is reflected in a non-diffusive (i.e. specular) manner within the additive-primary color band differently for a different range of viewing angles. This coloring media coating can be used to produce fantastic, eye-catching color effects dependent on viewing angle.

In order that the super-white coloring media of the present invention provides a super-white (MgO-like) color appearance in the eyes of the viewer independent of viewing angle, the broadband CLC microflakes should be randomly (or quasi-randomly) oriented within the coating or layer of applied carrier medium, as schematically illustrated in FIG. 3A1. This way, broadband incident light having spectral components from about 400 nm to about 750 nm in visible band, is reflected in a diffusive (i.e. non-specular) manner. To ensure that the broadband CLC microflakes assume random orientation within a coating of carrier medium, the mean thickness of the film coating should be at least 60 microns to ensure a large viewing angle, i.e., close to 90° from surface normal. As in the case of additive-primary coloring media coatings, such carrier thicknesses can be achieved by engineering the viscosity of the carrier medium so that broadband CLC microflakes within an applied layer (or coating) of the super-white coloring media are allowed to automatically assume a substantially random or quasi-random orientation within the applied layer. In order to facilate this random orientation of the CLC flakes, a suitably thick (e.g. 60 microns) coating of the CLC ink or paint should be applied to the substrate during drying. With the CLC microflake size being about 60 microns or less, and the thickness of the microflakes about 20 microns, a 60 micron thick coating allows a portion of the microflakes to assume a random or quasi-random orientation during application onto the substrate, while other microflakes stack up in any overlying relationship, relative to the substrate within the carrier medium.

In order that the coloring media of the present invention provides a "mirror-like" color appearance in the eyes of the viewer "independent" on viewing angle, the broadband CLC microflakes should be uniformly and flatly oriented within the coating or layer of applied carrier medium, as schematically illustrated in FIG. 3A2. This way, broadband incident light having spectral content from about 400 nm to about 750 nm in visible band, is reflected in a non-diffusive (i.e. specular) manner independent of viewing angle. This coloring media coating can be used to produce mirrorlike surfaces and finishes which do not depend on viewing angle.

Selection of suitable carrier fluids for the CLC inks and paints of the present invention may be found by reference to Chapter 18 of "Printing Technology (3rd Edition)" 1988, by J. Michael Adams, published by Delmar Publishers, Inc., of Albany, N.Y., incorporated herein by reference. Notably, the carrier medium may be realized using a wax material in order to form crayons according to the spirit of the present application. In addition to a suitable carrier, the CLC inks and paints of the present invention may also include additives chosen for tackiness, drying speed, adhesion to substrates, use with particular printing or painting methods, as well as other properties.

Step D: Adding CLC Microflakes to the Selected Carrier Medium to Produce the Desired Coloring Media of the Present Invention The fourth step (i.e. "Step D") of the coloring media fabrication process involves adding the CLC microflakes (made during Step B) to the light transmissive carrier medium (selected during Step C) in order to make either super-white (i.e. MgO-like) coloring media, mirror-like coloring media, or additive-primary coloring media of the present invention. This step of the fabrication process is described in great detail in the applicants'copending application entitled "COLORING MEDIA HAVING IMPROVED BRIGHTNESS AND COLOR CHARACTERISTICS" filed on the same date hereof, and is incorporated herein by reference in its entirety.

Step E: Preparing/Treating the Substrate (i.e. Surface) to which the Coloring Media is to be Applied Prior to using the CLC coloring media of the present invention in an "additive primary" coloring system, it is highly desired to first ensure that the substrate (i.e. surface) to be printed or painted upon is properly rendered radiation absorbing over the spectrum of light of the ambient environment (e.g. from 400 nm to 750 nm). Typically, this involves applying a flat (non-shining) black primer (i.e. surface blackening) to the substrate using conventional techniques. The substrate may be made from a wide variety of materials including, for example, virtually paper, glass, metal, plastic, fabric, etc.

When the super-white CLC coloring media is applied to a radiation absorbing substrate to form non-specularly reflective color images or color surfaces, the broadband CLC microflakes will be either suspended within the carrier medium parallel to the substrate surface in an overlapping relationship with other microflakes and/or be randomly or quasi-randomly suspended within the carrier medium, wherein the CLC helical axes of the liquid crystal molecules within each microflake are oriented normal to the planar surface of the microflake. By virtue of the configuration of the broadband CLC microflakes within the carrier medium, incident light on any applied CLC coating embodying the same will naturally undergo non-specular (i.e. diffusive) reflection, thereby producing a Magnesium-Oxide like "super-white" color response characteristics within the human vision system.

When the super-white CLC coloring media is applied to a radiation absorbing substrate to form non-specularly reflective color images or color surfaces, the broadband CLC microflakes will be either suspended within the carrier medium parallel to the substrate surface in an overlapping relationship with other microflakes and/or be randomly or quasi-randomly suspended within the carrier medium, wherein the CLC helical axes of the liquid crystal molecules within each microflake are oriented normal to the planar surface of the microflake. By virtue of the configuration of the broadband CLC microflakes within the carrier medium, incident light on any applied CLC coating embodying the same will naturally undergo non-specular (i.e. diffusive) reflection, thereby producing a Magnesium-Oxide like "super-white" color response characteristics within the human vision system.

When the mirror-like CLC coloring media is applied to a radiation absorbing substrate to form specularly reflective color images or color surfaces, the broadband CLC microflakes will be suspended within the carrier medium parallel to the substrate surface in a substantially planar relationship with other microflakes, wherein the CLC helical axes of the liquid crystal molecules within each microflake are oriented normal to the planar surface of the microflake. By virtue of the configuration of the broadband CLC microflakes within the carrier medium, incident light on any applied CLC coating embodying broadband CLC microflakes hereof will naturally undergo specular (i.e. non-diffusive) reflection, thereby producing a mirror-like color response characteristics within the human vision system.

When the specularly-reflective CLC coloring media is applied to a radiation absorbing substrate to form specularly reflective color images or color surfaces, the spectrally-tuned CLC microflakes will be suspended within the carrier medium parallel to the substrate surface in a substantially planar relationship with other microflakes, wherein the CLC helical axes of the liquid crystal molecules within each microflake are oriented normal to the planar surface of the microflake. By virtue of the configuration of the spectrally-tuned CLC microflakes within the carrier medium, incident light on any applied CLC coating embodying spectrally-tuned CLC microflakes hereof will naturally undergo specular (i.e. non-diffusive) reflection, thereby producing highly saturated red, green or blue color response characteristics within the human vision system, highly dependent on viewing angle.

When the non-specularly-reflective CLC coloring media is applied to a radiation absorbing substrate to form non-specularly reflective color images or color surfaces, the spectrally-tuned CLC microflakes will be suspended within the carrier medium in a quasi-random relationship, wherein the CLC helical axes of the liquid crystal molecules within each microflake are oriented normal to the planar surface of the microflake. By virtue of the configuration of the spectrally-tuned CLC microflakes within the carrier medium, incident light on any applied CLC coating embodying spectrally-tuned CLC microflakes hereof will naturally undergo nonspecular (i.e. diffusive) reflection, thereby producing highly-saturated single color response characteristics within the human vision system, independent of viewing angle.

Step F: Applying CLC Coloring Media to the Treated Substrate

Exploiting the remarkable additive and color saturation properties, the red, green, blue and super-white CLC inks of the present invention are sufficient to generate all colors sensible by the human vision system. These CLC color inks, paints and crayons may be mixed together alone or in combination with the super-white (MgO-like) media of the present invention before application to the substrate, or sequentially as they are applied in turn onto the substrate. The CLC inks and paints hereof can be applied to virtually any radiation absorbing surface having either 2-D or 3-D surface characteristics.

Mechanisms for applying and drying/curing the CLC coloring media described above are disclosed in great detail in applicants'copending Application entitled "COLORING MEDIA HAVING IMPROVED BRIGHTNESS AND COLOR CHARACTERISTICS", supra.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. Reflective film comprising:
    material having upper and a lower surfaces and liquid crystal molecules cholesterically ordered along helical axes extending substantially perpendicular between said upper and lower surfaces;
    wherein the reflection characteristics of said upper surface is substantially the same as the reflection characteristics of said lower surface over a prespecified band of said electromagnetic spectrum; and
    wherein said cholesterically ordered liquid crystal molecules in said material have a pitch which varies in a non-linear manner across the thickness of said material.

2. The reflective film of claim 1, wherein said material comprises first and second layers of CLC material laminated together, wherein said upper surface is physically associated with said first layer and said lower surface is physically associated with said second layer.

3. The reflective film of claim 1, wherein said cholesterically ordered liquid crystal molecules in said material have a pitch which varies in an exponential manner across the thickness of said material.

4. The reflective film of claim 1, wherein circularly polarized electromagnetic radiation in the infrared portion of the electromagnetic spectrum reflects off said upper and lower surfaces according to substantially similar reflection characteristics.

5. The reflective film of claim 1, wherein circularly polarized electromagnetic radiation in the ultraviolet portion of the electromagnetic spectrum reflects off said upper and lower surfaces having substantially similar reflection characteristics.

6. The reflective film of claim 1, wherein circularly polarized electromagnetic radiation in a selected portion of the visible band reflects off said upper and lower surfaces having substantially similar reflection characteristics.

7. The reflective film of claim 1, wherein the reflection characteristics of said upper surface are substantially the same as the reflection characteristics of said lower surface over a broadband visible portion of said electromagnetic spectrum.

8. The reflective film of claim 1, wherein the reflection characteristics of said upper surface are substantially the same as the reflection characteristics of said lower surface over a narrowband portion of said electromagnetic spectrum.

9. The reflective film of claim 1, wherein the reflection characteristics of said upper surface are substantially the same as the reflection characteristics of said lower surface over the infrared (IR) portion of said electromagnetic spectrum.

10. The reflective film of claim 1, wherein the reflection characteristics of said upper surface are substantially the same as the reflection characteristics of said lower surface over the ultra-violet (UV) portion of said electromagnetic spectrum.

11. The reflective film of claim 1, wherein said upper surface is physically associated with said first layer and reflects right-handed circularly polarized (RHCP) electromagnetic radiation incident thereto, and wherein said lower surface is physically associated with said second layer and reflects right-handed circularly polarized (RHCP) electromagnetic radiation incident thereto.

12. The reflective film of claim 1, wherein said upper surface is physically associated with said first layer, reflects left-handed circularly polarized (LHCP) electromagnetic radiation incident thereto and has a first $\pi/2$ phase retardation surface formed therein, and wherein said lower surface is physically associated with said second layer and reflects left-handed circularly polarized (LHCP) electromagnetic radiation incident thereto and has a second $\pi/2$ phase retardation surface formed therein.

13. The reflective film of claim 1, wherein said upper surface is physically associated with said first layer, reflects right-handed circularly polarized (RHCP) electromagnetic radiation incident thereto and has a first $\pi/2$ phase retardation surface formed therein, and wherein said lower surface is physically associated with said second layer and reflects right-handed circularly polarized (RHCP) electromagnetic radiation incident thereto and has a second $\pi/2$ phase retardation surface formed therein.

14. The reflective film of claim 1, wherein said first and second layers are made from the same CLC film material, and said upper and lower surfaces have substantially similar reflection characteristics over said prespecified band of said electromagnetic spectrum.

15. A method of making reflective film having symmetrical reflection characteristics over at least a portion of the visible band of the electromagnetic spectrum, said method comprising the steps of:
    (a) producing a first layer of film material having upper and a lower surfaces,
        wherein the reflection characteristics of said upper surface of said first layer is substantially different from the reflection characteristics of said lower surface of said first layer over the visible band of said electromagnetic spectrum;
    (b) producing a second layer of film material having upper and a lower surfaces,
        wherein the reflection characteristics of said upper surface of said second layer is substantially different from the reflection characteristics of said lower surface of said second layer over the visible band of said electromagnetic spectrum, and the reflection characteristics of said upper surface of said first layer is substantially similar to the reflection characteristics of said upper surface of said second layer over the visible band of said electromagnetic spectrum; and
    (c) bringing the upper surface of said first layer in physical contact with the upper surface of said second layer and laminating said layers together to produce a composite film having upper and lower surfaces,
        wherein said upper and lower surfaces of said composite film have substantially similar the reflection characteristics over at least a portion of the visible band of said electromagnetic spectrum.

16. The method of claim 15, wherein said reflection characteristics over the visible band of said electromagnetic spectrum of said composite film are super-broadband.

17. The method of claim 15, which further comprises after step (c), (d) fragmenting said composite film into reflective microflakes having lengthwise and widthwise dimensions in the range of about 5 to about 100 microns.

18. The method of claim 15, wherein said first layer of film material comprises a first distribution of liquid crystal molecules cholesterically ordered along helical axes extending substantially perpendicular between the upper and lower surfaces of said first layer, and wherein said second layer of film material comprises a second distribution of liquid crystal molecules cholesterically ordered along helical axes extending substantially perpendicular between the upper and lower surfaces of said second layer.

19. The method of claim 18, wherein step (a) comprises producing said first layer so that said upper surface reflects right-handed circularly polarized (RHCP) electromagnetic radiation incident thereto, and wherein step (b) comprises producing said second layer so that said lower surface reflects right-handed circularly polarized (RHCP) electromagnetic radiation incident thereto.

20. The method of claim 19, wherein step (a) comprises producing said first layer so that said upper surface reflects left-handed circularly polarized (LHCP) electromagnetic radiation incident thereto, and wherein step (b) comprises producing said second layer so that said lower surface reflects left-handed circularly polarized (LHCP) electromagnetic radiation incident thereto.

21. The method of claim 18, wherein step (a) comprises producing said first layer so that said upper surface reflects right-handed circularly polarized (RHCP) electromagnetic radiation incident thereto and has a first $\pi/2$ phase retardation surface formed therein, and wherein step (b) comprises producing said second layer so that said lower surface reflects right-handed circularly polarized (RHCP) electromagnetic radiation incident thereto and has a second $\pi/2$ phase retardation surface formed therein.

22. The method of claim 18, wherein step (a) comprises producing said first layer so that said upper surface reflects left-handed circularly polarized (LHCP) electromagnetic radiation incident thereto and has a first $\pi/2$ phase retardation surface formed therein, and wherein step (b) comprises producing said second layer so that said lower surface reflects left-handed circularly polarized (LHCP) electromagnetic radiation incident thereto and has a second $\pi/2$ phase retardation surface formed therein.

23. Apparatus for making reflective film having symmetrical reflection characteristics over at least a portion of the visible band of the electromagnetic spectrum, said apparatus comprising:

film layer producing means for producing a first layer of film material having upper and lower surfaces, and a second layer of film material having upper and lower surfaces, wherein the reflection characteristics of said upper surface of said first layer is substantially different from the reflection characteristics of said lower surface of said first layer over the visible band of said electromagnetic spectrum, and wherein the reflection characteristics of said upper surface of said second layer is substantially different from the reflection characteristics of said lower surface of said second layer over the visible band of said electromagnetic spectrum, and the reflection characteristics of said upper surface of said first layer is substantially similar to the reflection characteristics of said upper surface of said second layer over the visible band of said electromagnetic spectrum; and film contacting means for bringing the upper surface of said first layer in physical contact with the upper surface of said second layer and laminating said layers together to produce a composite film having upper and lower surfaces, wherein said upper and lower surfaces of said composite film have substantially similar the reflection characteristics over at least a portion of the visible band of said electromagnetic spectrum.

24. The apparatus of claim 23, wherein said reflection characteristics over the visible band of said electromagnetic spectrum of said composite film are super-broadband.

25. The apparatus of claim 23, which further comprises:

film fragmenting means for fragmenting said composite film into reflective microflakes having lengthwise and widthwise dimensions in the range of about 5 to about 100 microns.

26. The apparatus of claim 23, wherein said first layer of film material comprises a first distribution of liquid crystal molecules cholesterically ordered along helical axes extending substantially perpendicular between the upper and lower surfaces of said first layer, and wherein said second layer of film material comprises a second distribution of liquid crystal molecules cholesterically ordered along helical axes extending substantially perpendicular between the upper and lower surfaces of said second layer.

27. The apparatus of claim 26, wherein said film layer producing mean comprises:

means for producing said first layer so that said upper surface reflects right-handed circularly polarized (RHCP) electromagnetic radiation incident thereto and has a first $\pi/2$ phase retardation surface formed therein; and means for producing said second layer so that said lower surface reflects right-handed circularly polarized (RHCP) electromagnetic radiation incident thereto and has a second $\pi/2$ phase retardation surface formed therein.

28. The apparatus of claim 26, wherein said film layer producing means comprises:

means for producing said first layer so that said upper surface reflects left-handed circularly polarized (LHCP) electromagnetic radiation incident thereto and has a first $\pi/2$ phase retardation surface formed therein; and means for producing said second layer so that said lower surface reflects left-handed circularly polarized (LHCP) electromagnetic radiation incident thereto and has a second $\pi/2$ phase retardation surface formed therein.

29. The apparatus of claim 23, wherein said film layer producing means comprises:

means for producing said first layer so that said upper surface reflects right-handed circularly polarized (RHCP) electromagnetic radiation incident thereto; and means for producing said second layer so that said lower surface reflects right-handed circularly polarized (RHCP) electromagnetic radiation incident thereto.

30. The apparatus of claim 23, wherein said film layer producing means comprises:

means for producing said first layer so that said upper surface reflects left-handed circularly polarized (LHCP) electromagnetic radiation incident thereto; and means for producing said second layer so that said lower surface reflects left-handed circularly polarized (LHCP) electromagnetic radiation incident thereto.

* * * * *